(12) United States Patent
Nakagawa

(10) Patent No.: US 12,277,357 B2
(45) Date of Patent: Apr. 15, 2025

(54) RELATED INFORMATION PROVIDING METHOD FOR IMAGE PROCESSING, IMAGE PROCESSING SYSTEM, AND IMAGE PROCESSING DEVICE

(71) Applicant: SHARP KABUSHIKI KAISHA, Osaka (JP)

(72) Inventor: Takashi Nakagawa, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/507,305

(22) Filed: Nov. 13, 2023

(65) Prior Publication Data

US 2024/0168687 A1 May 23, 2024

(30) Foreign Application Priority Data

Nov. 22, 2022 (JP) ................................. 2022-186671
Aug. 28, 2023 (JP) ................................. 2023-138173

(51) Int. Cl.
*G06F 3/12* (2006.01)
*G06F 21/31* (2013.01)

(52) U.S. Cl.
CPC .......... *G06F 3/1253* (2013.01); *G06F 3/1204* (2013.01); *G06F 3/1285* (2013.01); *G06F 21/31* (2013.01)

(58) Field of Classification Search
None
See application file for complete search history.

(56) References Cited

U.S. PATENT DOCUMENTS

| 8,326,090 B2 * | 12/2012 | Todaka | G06F 16/583 |
| | | | 382/229 |
| 2022/0269857 A1 * | 8/2022 | Carrier | G06F 40/284 |
| 2023/0385541 A1 * | 11/2023 | Ben Shahar | G06F 40/20 |

FOREIGN PATENT DOCUMENTS

| JP | H07-261609 A | 10/1995 |
| JP | 2004118415 A * | 4/2004 |
| JP | 2006-217276 A | 8/2006 |
| WO | WO-2021107978 A1 * | 6/2021 | ........... G06F 3/1204 |

OTHER PUBLICATIONS

English translation of JP-2004118415-A. (Year: 2004).*

* cited by examiner

*Primary Examiner* — Thomas D Lee
(74) *Attorney, Agent, or Firm* — ScienBiziP, P.C.

(57) ABSTRACT

A related information providing method for providing related information comprises, controlling an image processing device, and executing a job pertaining to image processing that performs at least one of processing that reads a document and outputs or stores image data, or processing that loads print data and prints or stores image data; causing a user to select whether or not performing a search is permitted using extracted information, which is obtained by extracting information about at least one of a character or an image from image data of the document or the print data; extracting the extracted information from the image data when a search using the extracted information is permitted; searching a database stored in a data storage device for related information that relates to the extracted information; providing the user with the related information; and registering the extracted information and the image data in the database.

16 Claims, 24 Drawing Sheets

FIG. 24

USER TABLE 530

| USER ID | GROUP ID | SCAN (MONOCHROME/ COLOR) | COPY (MONOCHROME/ COLOR) | PRINT (MONOCHROME/ COLOR) | AI SERVICE |
|---|---|---|---|---|---|
| 001 | 001 | - | - | - | - |
| 002 | 002 | - | - | - | - |
| 003 | 002 | - | - | - | 001 |
| 004 | 001 | ○/× | ○/× | ○/× | - |
| 005 | 002 | ○/× | ○/× | ○/× | × |
| 006 | 003 | - | - | - | - |
| 007 | 003 | - | - | - | 002 |
| 008 | 004 | - | - | - | - |

FIG. 25

GROUP TABLE 540

| GROUP ID | SCAN (MONOCHROME/ COLOR) | COPY (MONOCHROME/ COLOR) | PRINT (MONOCHROME/ COLOR) | AI SERVICE |
|---|---|---|---|---|
| 001 | ○/○ | ○/○ | ○/○ | 001 |
| 002 | ○/○ | ○/○ | ○/○ | 002 |
| 003 | ×/× | ○/○ | ○/○ | × |
| 004 | ○/× | ○/× | ○/× | × |

RELATED INFORMATION PROVIDING METHOD FOR IMAGE PROCESSING, IMAGE PROCESSING SYSTEM, AND IMAGE PROCESSING DEVICE

CROSS-REFERENCE TO RELATED APPLICATION

The present application claims priority from Japanese Application JP2022-186671 and Japanese Application JP2023-138173, the content of which is hereby incorporated by reference into this application.

BACKGROUND

1. Field

The present disclosure relates to a related information providing method that provides, to a user, information that is related to an image of a document that is read for a job for an image processing device, or to an image that is used for printing, and an image processing system and an image processing device that are related to providing the related information.

2. Description of the Related Art

An image processing device such as a printer, a scanner, or a multifunction peripheral is known that reads and prints an image included in one or more documents, stores the image as data, or transmits the image to an external device. The image processing device treats print data which is composed of the images of one or more documents or one or more pages as a single batch process. The unit of a single batch process is referred to as a job. There is known an image forming device that displays, on a display of the display image forming device, information other than information about the image forming device, such as an advertisement, during processing of a job such as copying (for example, see Japanese Unexamined Patent Publication No. H7-261609). Further, an image forming device has been proposed that not only simply displays a fixed advertisement, but also reads an image of a document as input information, and displays information that is related to the input image. More specifically, an image is read from a document, a predetermined region of the read image is extracted, and an item composed of a character string is recognized from the extracted region. Then, a database memory is searched based on the extracted item, and it is determined whether or not related information exists that is related to the item. When related information exists, the related information is read and then displayed (for example, see Japanese Unexamined Patent Publication No. 2006-217276).

SUMMARY

Japanese Unexamined Patent Publication No. H7-261609 discloses that an image forming device effectively uses a display by displaying an advertisement during processing of a job. It is convenient to be able to display not only advertisements, but also information useful or interesting to the user. Japanese Unexamined Patent Publication No. 2006-217276 discloses notification of information that is related to the input information. However, the input information may include information that the user does not want a third party to know, such as personal information or secret information, and there is no mention of protection of the information. The present disclosure has been made in view of the circumstances above, and enables information from within previously executed image processing having a high relevance to be provided to the user, while considering the protection of the information.

The present disclosure provides a related information providing method for image processing that is executed by at least one processor that individually or collectively controls an image processing device and a data storage device, the method including the steps of: controlling the image processing device, and executing a job pertaining to image processing that performs at least one of processing that reads a document and outputs or stores image data, or processing that loads print data and prints or stores image data; causing a user to select whether or not performing a search is permitted using extracted information, which is obtained by extracting information about at least one of a character or an image from image data of the document or the print data; extracting the extracted information from the image data when a search using the extracted information is permitted; searching a database stored in the data storage device for related information that relates to the extracted information; providing the user with the related information obtained by the search; and registering the extracted information and extraction source image data from which the extracted information was extracted in the database.

Furthermore, from a different viewpoint, the present disclosure provides an image processing system including an image processing device and a data storage device that stores a database, wherein the image processing device includes a job executor that executes a job pertaining to image processing that performs at least one of processing that reads a document and outputs or stores image data, or processing that receives and loads print data and prints or stores image data, a search usage permission selector that causes a user to select whether or not a search is permitted using extracted information, which is obtained by extracting information about at least one of a character or an image from image data of the document or the print data, and a related information provider that, when a search using the extracted information is permitted, provides related information obtained by a search of the database, to the user, and the data storage device comprises a related information searcher that, when a search using the extracted information is permitted, searches for related information that is related to the extracted information from within the database, and provides a search result to the image processing device, and an extracted information registerer that registers the extracted information and extraction source image data from which the extracted information was extracted in the database.

In addition, the present disclosure provides an image processing device including: a job executor that executes a job pertaining to image processing that performs at least one of processing that reads a document and outputs or stores image data, or processing that receives and loads print data and prints or stores image data; a search usage permission selector that causes a user to select whether or not a search is permitted using extracted information, which is obtained by extracting information about at least one of a character or an image from image data of the document or the print data; a data storage that stores a database; a related information searcher that, when a search using the extracted information is permitted, searches the data storage for related information that is related to the extracted information from within the database; a related information provider that provides the related information obtained from the search to the user; and an extracted information registerer that, when a search using the extracted information is permitted, registers the extracted information and extraction source image data from which the extracted information was extracted in the database.

The present disclosure provides an image processing device including: a job executor that executes a job pertaining to image processing that performs at least one of processing that reads a document and outputs or stores image data, or processing that receives and loads print data and prints or stores image data; a natural language processing usage permission setter that accepts a setting of whether or not performing natural language processing using extracted information, which is obtained by extracting information about a character from image data of the document or the print data, is permitted; and a processing result acquirer that accesses an external natural language processing service and causes natural language processing to be performed using the extracted information, and acquires a result from the natural language processing service.

Moreover, from a different viewpoint, the present disclosure provides a method for performing natural language processing using related information pertaining to a job that is executed by at least one processor that controls an image processing device, the method including the steps of: executing a job pertaining to image processing that performs at least one of processing that reads a document and outputs or stores image data, or processing that loads print data and prints or stores image data; causing a user to set whether or not performing natural language processing using extracted information, which is obtained by extracting information about a character from image data of the document or the print data, is permitted; accessing an external natural language processing service and performing natural language processing using the extracted information when natural language processing using the extracted information is permitted; and acquiring a result from the natural language processing service.

Because the related information providing method according to the present disclosure includes causing a user to select whether or not performing a search is permitted using extracted information, which is obtained by extracting information about at least one of characters and images from image data of the document or the print data, extracting the extracted information from the image data, and searching for related information that is related to the extracted information from a database stored in the data storage device, it is possible to provide the user with information that is related to image processing while considering the protection of the information. Further, because the related information providing method according to the present disclosure includes registering extracted information and extraction source image data from which the extracted information was extracted in the database, the previous extracted information and extraction source images are registered in the database, and it is possible to provide the user with information having a high relevance from the image processing that has been previously executed. The image processing system and the image processing device according to the present disclosure provide the same operational effects.

BRIEF DESCRIPTION OF THE DRAWINGS

FIG. 24 is an explanatory diagram showing an example of a user table that is referred to in the flowchart in FIG. 21.

FIG. 25 is an explanatory diagram showing an example of a group table that is referred to in the flowchart in FIG. 21.

DESCRIPTION OF EMBODIMENTS

Figure 1:
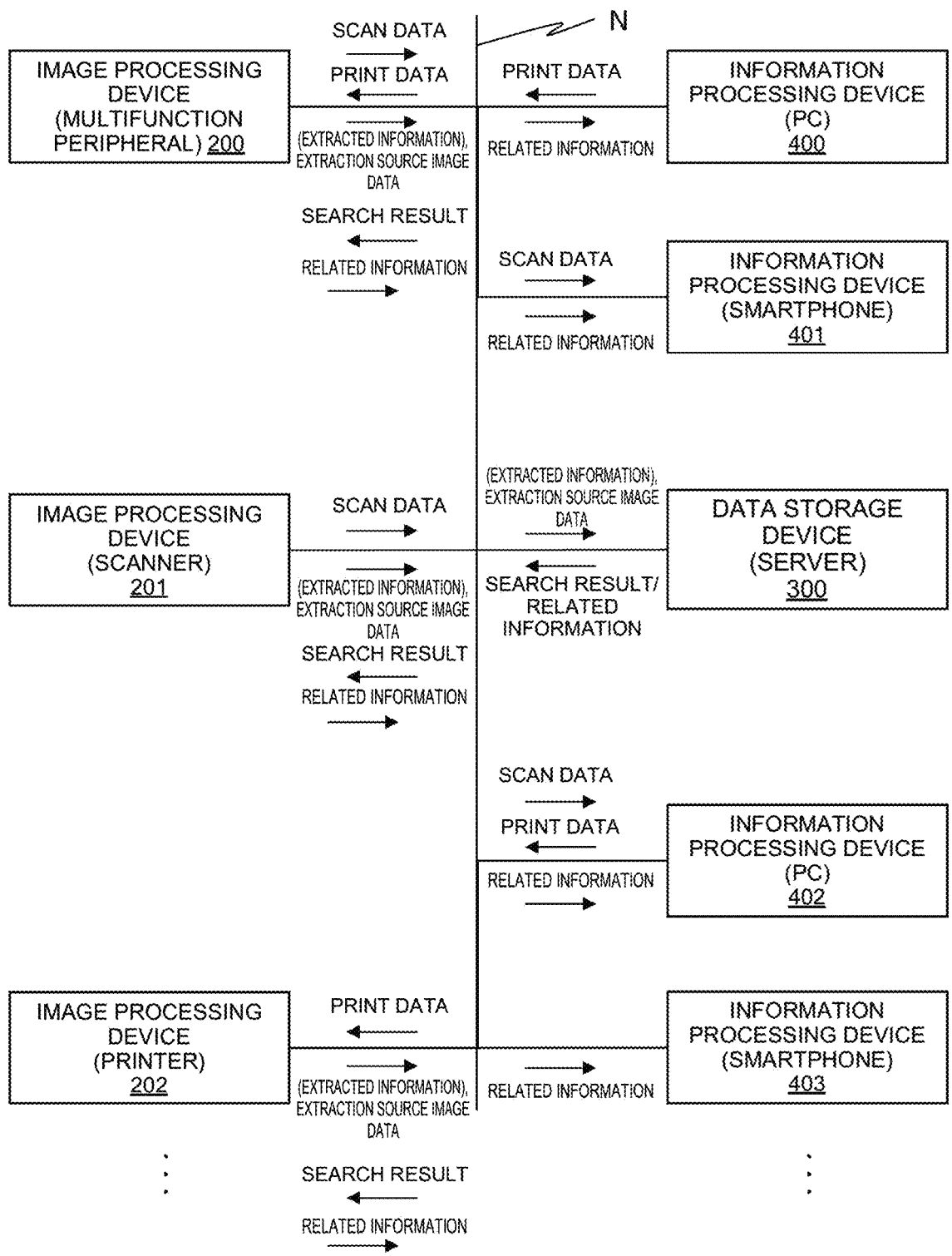
FIG. 1 is an explanatory diagram showing a configuration example of a system in which image processing devices, a data storage device, and information processing devices used by a user according to the present disclosure are connected via a network.

Hereinafter, the present disclosure will be described in more detail with reference to the drawings. Note that the description below is illustrative in all respects, and should not be construed as limiting the present disclosure. FIG. 1 is an explanatory diagram showing a configuration example of system in which image processing devices, a data storage device, and information processing devices used by a user according to the present disclosure are connected via a network.

In FIG. 1, the image processing device 200 is a multi-function peripheral. The multifunction peripheral is capable of outputting or storing image data (scan data) obtained by reading a document using a document reading unit. Furthermore, the multifunction peripheral is capable of loading (extracting) print data received from the outside using an engine unit, and then printing or storing the image data. The image processing device 201 is an image scanner. The image scanner includes a document reading unit, but does not include an engine unit. The image processing device 202 is a printer. The printer includes an engine unit, but does not include a document reading unit. In FIG. 1, the data storage device is a server 300. Furthermore, the information processing devices 400 and 402 are PCs (personal computers) used by the user. The information processing device 401 and the information processing device 403 are smartphones used by the user. In FIG. 1, the image processing devices 200, 201 and 202, the server 300, being a data storage device, and the information processing devices 400, 401, 402 and 403 are connected via a network N, and are capable of transmitting and receiving data.

Figure 2:
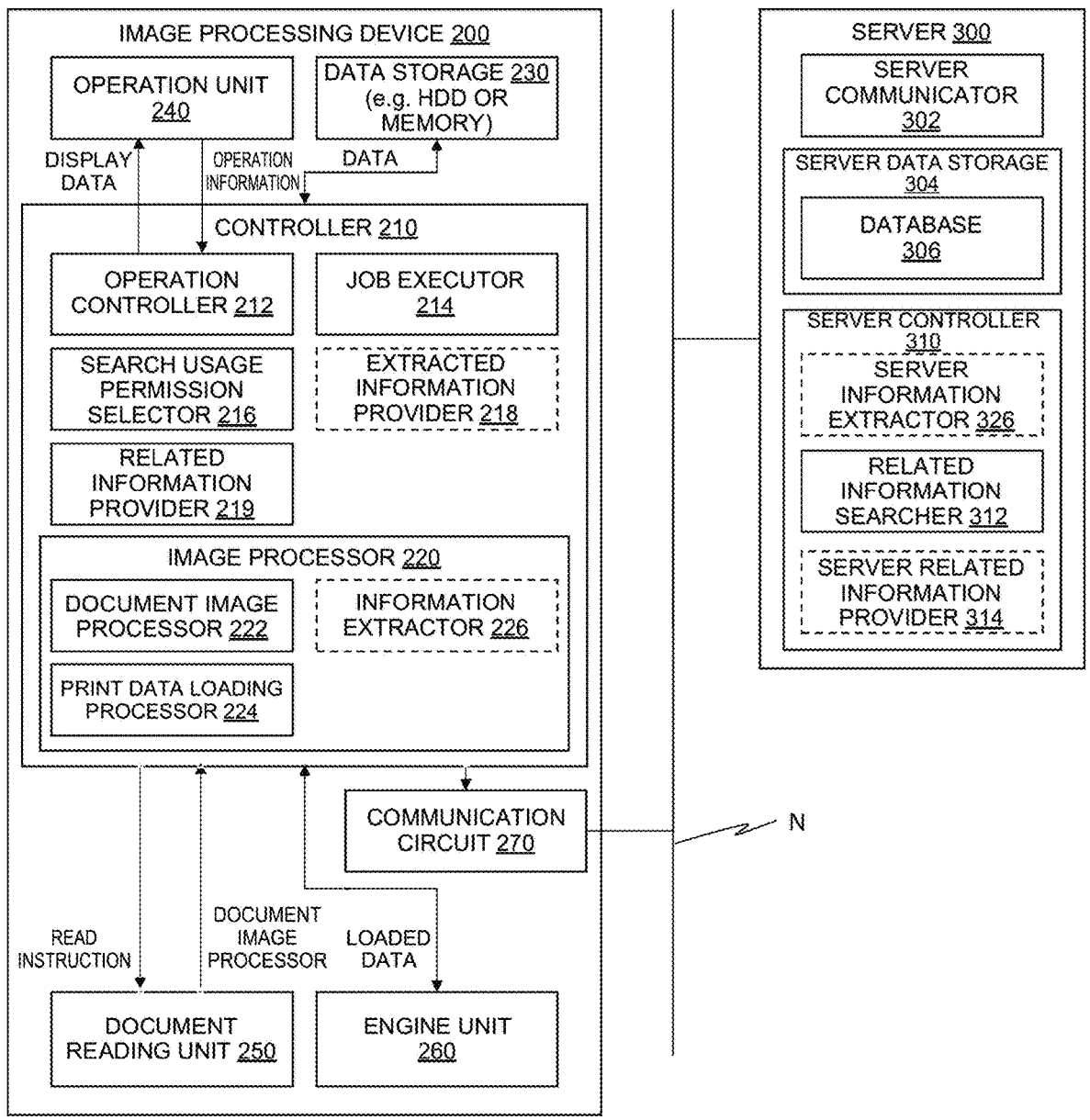
FIG. 2 is a block diagram showing a configuration example of the image processing device and the server, being a data storage device, shown in FIG. 1.

FIG. 2 is a block diagram showing a configuration example of the image processing device and the server, being a data storage device, shown in FIG. 1. The image processing device 200 (that is, the multifunction peripheral) shown in FIG. 1 is shown as a representative example. The image processing device 200 includes a controller 210, a data storage 230, an operation unit 240, a document reading unit 250, an engine unit 260, and a communication circuit 270. The controller 210 includes an operation controller 212, a job executor 214, a search usage permission selector 216, an extracted information provider 218, a related information provider 219, and an image processor 220. The image processor 220 includes a document image processor 222 and a print data loading processor 224. Further, an information extractor 226 is optionally provided.

The controller 210 is a circuit mainly composed of a processor and memory as hardware resources. When the processor executes a control program stored in the memory, the functions of each of the operation controller 212, the job executor 214, the search usage permission selector 216, the extracted information provider 218, the related information provider 219, and the image processor 220 mentioned above are realized.

The data storage 230 is configured to be accessible from the controller 210, and is a combination of RAM and nonvolatile memory. DDR SDRAM (double-data-rage synchronous dynamic random access memory) such as DDR4 or DDR5 may be applied as the RAM. An SSD (solid state disk) or HDD (hard disk drive) may be applied as the nonvolatile memory. At least part of the memory of the controller 210 and the data storage 230 may be shared.

The operation unit 240 is configured by a display device such as an LCD (liquid crystal display) or an OLED (organic light-emitting display) that displays information about the status and operation of the image processing device 200, and an input detection device such as a touch panel that detects operations. The document reading unit 250 includes a mechanism, a circuit, and an image sensor for scanning and reading a document, and is a part that generates image data corresponding to a document. The engine unit 260 includes mechanisms and circuits for performing electrophotographic charging, exposure, development, transfer, and fusing, a paper feed tray of the main body, and a paper feed conveyance mechanism that feeds and conveys printing paper, and is a part that executes printing. The communication circuit 270 is a circuit for performing communication with external equipment through wired communication such as an Ethernet, or wireless communication such as a wireless LAN or Bluetooth (registered trademark).

The operation controller 212 controls the display of the operation unit 240, and processes user operations detected by the operation unit 240. The job executor 214 controls job execution. The job executor 214 executes jobs such as copy jobs that read a document and print the image data, scan jobs that read a document and output or store the image data, and print jobs that load print data received from the outside and print the image data. The job executor 214 is provided with a job queue that manages the execution order of such jobs. The job queue provides a mechanism for successively executing jobs whose execution has been requested by registering the jobs in a wait list such that the resources required to execute each type of job, such as document reading, printing, and memory, do not conflict with each other.

The search usage permission selector 216 performs processing that asks a user whether or not usage of the image data pertaining to a job is permitted in a search for related information, and accepts the selection. The controller 210 may also include an information extractor 226 described below as well as the extracted information provider 218. The extracted information provider 218 provides the extracted information that has been extracted by the information extractor 226 to a data storage device. The related information provider 219 performs processing that, when a search using extracted information is permitted, provides the related information found by the search to the user. The image processor 220 performs processing for the reading and printing of a document, and image processing with respect to the read document image. The document image processor 222 performs processing that prepares image data by performing image processing with respect to the document image that has been read by the document reading unit 250. The print data loading processor 224 performs processing that loads the print data received from the outside and prepares image data that can be provided to the engine unit 260.

As mentioned above, the image processing device 200 may include the information extractor 226, which extracts information about at least one of characters and images from the image data of a document, print data, or image data obtained by loading print data. The information extractor 226, for example, may extract character information by applying character recognition processing to the image data.

Furthermore, information about an image may be extracted by applying various suitable image processing techniques. In this case, the controller 210 also includes the extracted information provider 218. However, the data storage device (server) side may also include a server information extractor 326, and this is referred to as a base embodiment (first embodiment). A mode in which the information extractor 226 and the extracted information provider 218 are provided on the image processing device side is referred to as a second embodiment. Hereinafter, the base configuration is similarly referred to as the first embodiment of the present disclosure, and modifications are referred to as different embodiments while providing additional description as needed.

The server 300, being a data storage device, includes a server communication unit 302, a server data storage 304, and a server controller 310. The server communication unit 302 is a circuit that enables the server 300 to perform communication with external equipment such as the image processing device 200 through wired communication such as an Ethernet, or wireless communication such as a wireless LAN or Bluetooth. The server data storage 304 may include a large-capacity storage device that stores the database 306 and other data, and an HDD or an SSD may be applied as the storage device. The server controller 310 is a circuit mainly composed of a processor and memory as hardware resources. The server controller 310 includes a related information searcher 312 and a server information extractor 326. A server related information provider 314 may also be provided. When the processor executes a control program stored in the memory, the functions of each of the related information searcher 312, the server related information provider 314, and the server information extractor 326 are realized.

Figure 3:
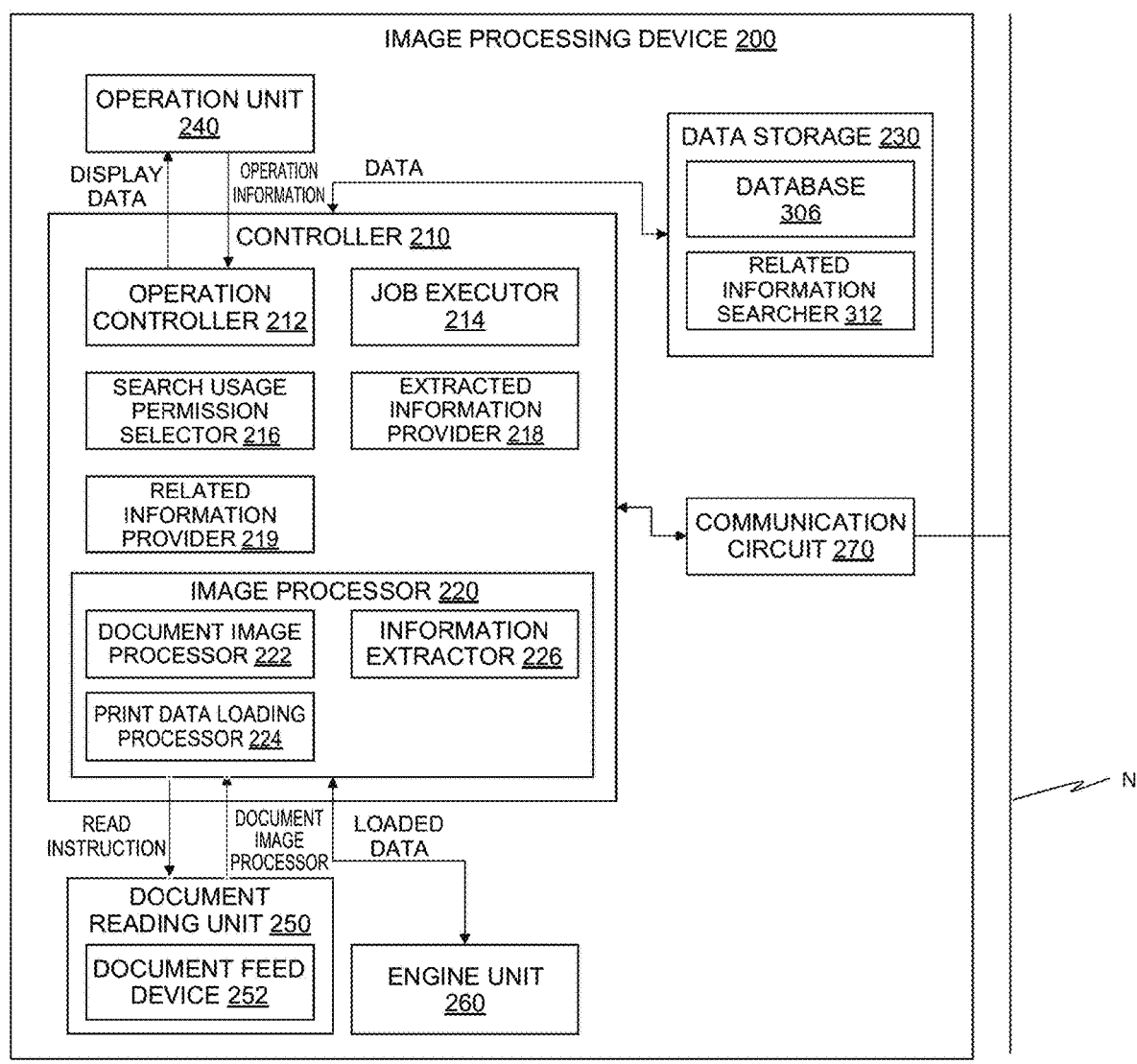
FIG. 3 is a block diagram illustrating a configuration example of an image processing device different to that of FIG. 2.

FIG. 3 is a block diagram illustrating a configuration example of an image processing device different to that of FIG. 2. In FIG. 2, the database 306 is provided in the server 300, which enables a configuration in which the server information extractor 326 is on the server 300 side. That is, it is possible to adopt either configuration among a configuration in which the information extractor 226 is provided in the image processing device 200 (second embodiment), and a configuration in which the server information extractor 326 is provided in the server 300 (first embodiment). In contrast, in the configuration shown in FIG. 3, the database is provided in a data storage of the image processing device 200 (third embodiment). Accordingly, a configuration that corresponds to the information extractor 226 is not shown in FIG. 3, because it is provided outside the image processing device 200. The components that correspond to those in FIG. 2 are denoted by the corresponding reference numerals.

Data Transmission and Reception Between Equipment

The data exchanged between equipment will be described with reference to FIGS. 1 and 2. In the present disclosure, the image data of a document or print data is generated by an image processing device. For example, FIG. 1 shows a case where the image processing device 200, which is a multifunction peripheral, reads a document by executing a scan job, generates image data, and transmits the scan data (image data) to the information processing device 401 (smartphone) of the user. Therefore, the output of scan data from the image processing device 200 is indicated by an arrow in FIG. 1. Further, the reception of the scan data by the information processing device 401 is indicated by an arrow in FIG. 1.

In addition, when a search using extracted information is permitted, the extraction source image data from which the extracted information is extracted is transmitted from the image processing device 200 to the server 300. Note that in the mode in which the image processing device 200 is provided with the information extractor 226, the extracted information is transmitted with the extraction source image data. The server 300 searches for related information using the extracted information, and transmits the search result to the image processing device 200. In the image processing device 200, when a selection is made to transmit the related information to an information processing device of the user (for example, the information processing device 401), the related information is transmitted to the information processing device 401. A mode is also possible in which the related information is directly provided from the server 300 to the information processing device of the user (for example, the information processing device 401).

For example, when the user generates print data in the information processing device 400 and then prints the print data using the image processing device 200, the print data is transmitted from the information processing device 400 to the information processing device 200, and the image processing device 200 executes a print job. When a search using extracted information is permitted, the image data from which the extracted information is extracted (extraction source image data) is transmitted from the image processing device 200 to the server 300. In the mode in which the image processing device 200 is provided with the information extractor 226, the extracted information is transmitted with the extraction source image data. The server 300 searches for related information using the extracted information, and transmits the search result to the image processing device 200. In the image processing device 200, when a selection is made to transmit the related information to an information processing device of the user (for example, the information processing device 401), the related information is transmitted to the information processing device 401. A mode is also possible in which the related information is directly provided from the server 300 to the information processing device of the user (for example, the information processing device 401).

The same applies to the other image processing devices 201 and 202 and information processing devices 402 and 403. However, the image processing device 201, which is a scanner and does not include the engine unit 260, does not execute print jobs. Furthermore, the image processing device 202, which is a printer and does not include the document reading unit 250, does not execute scan jobs. The image processing device generates print data and causes the image processing device to execute a print job, or receives the scan data (image data) generated in a scan job. When a search using extracted information is permitted, it is preferable that the related information pertaining to the job is provided to the information processing device. However, the related information may also be provided to an information processing device that are not used in the execution of the job. For example, the user that executed a copy job can select an information processing device used by the user rather than the operation unit of an image processing device as the providing destination of the related information.

Flowcharts

Figure 4:
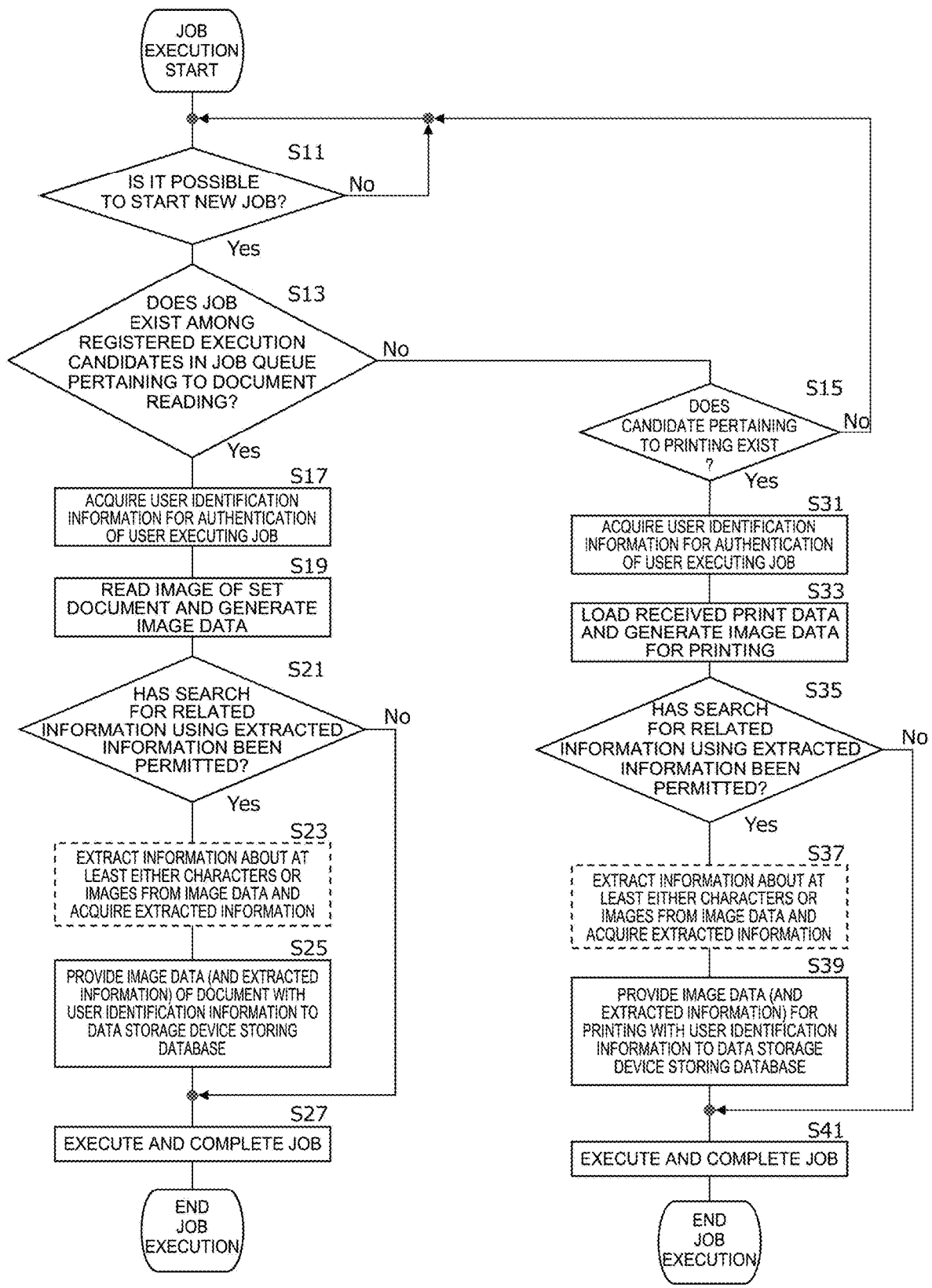
FIG. 4 is a flowchart showing an example of the processing by which the image processing device shown in FIG. 1 executes a job.
Figure 7:
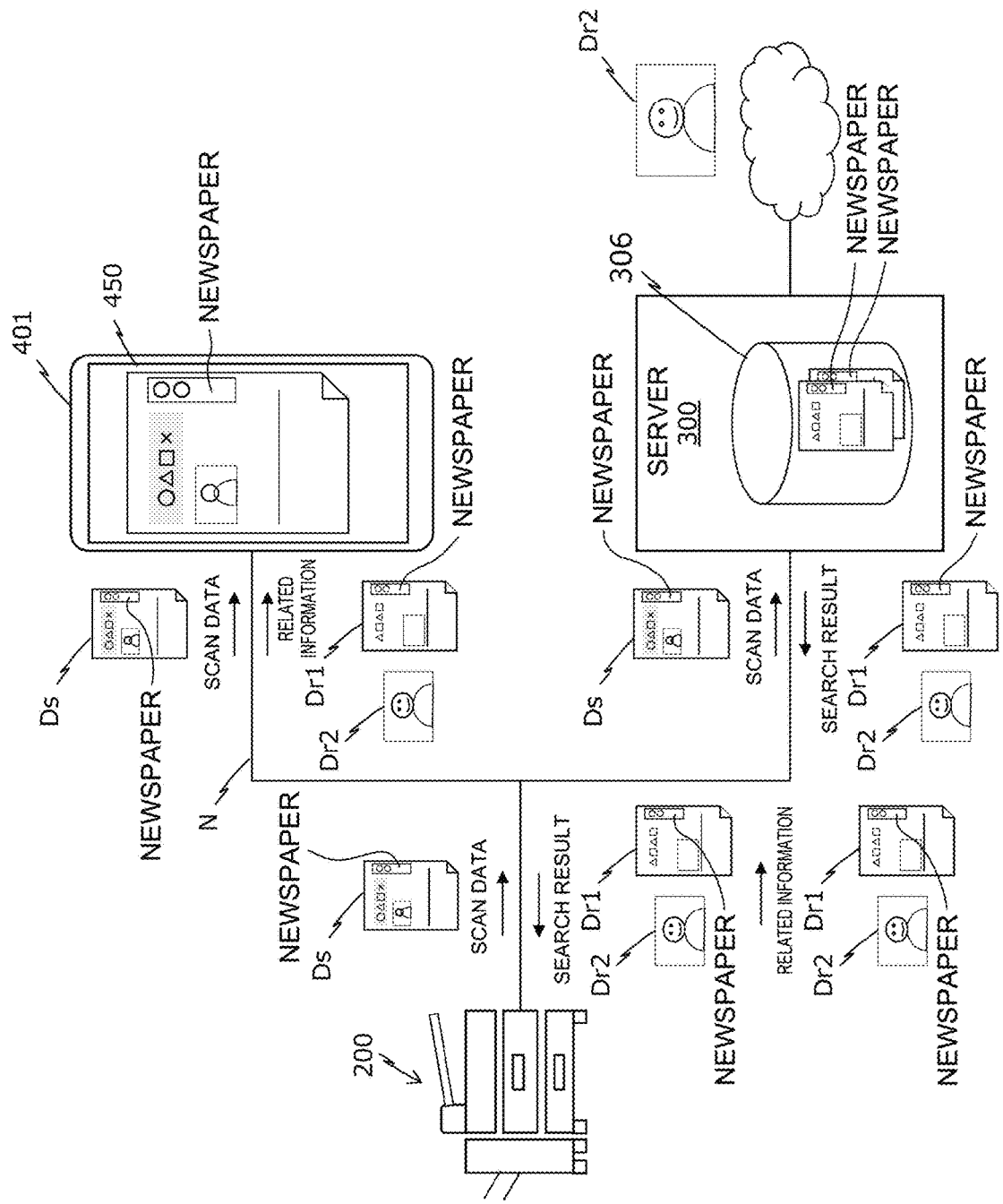
FIG. 7 is an explanatory diagram showing an example in which the image processing device shown in FIG. 1 executes a scan job, and scan data and related information pertaining to the job are provided to the information processing device.

Hereinafter, an example of the processing procedure of a related information providing method according to the present disclosure will be described with reference to FIG. 7 and the flowcharts. First, an example of processing in which an image processing device executes a job, and an image pertaining to the job is provided to a data storage device will be described. FIG. 4 is a flowchart showing an example of the processing by which the image processing device shown in FIG. 1, or more specifically, the controller 210 shown in FIG. 2, executes a job. FIG. 7 is an explanatory diagram showing an example in which the image processing device shown in FIG. 1 executes a scan job, and scan data and related information pertaining to the job are provided to the information processing device.

When a job can be started by the controller 210 serving as the job executor 214 (Yes in step S11 shown in FIG. 4), it refers to the job queue and finds, in order from the first (that is, the highest priority) job registered in the job queue, a job that can be executed without a conflict in resources such as document reading, printing, and memory. First, it is determined whether or not there is a job among the jobs pertaining to reading a document that can be executed (step S13). Examples of jobs pertaining to reading a document include copy jobs that print read image data, and scan jobs that store image data. Further examples include image transmission jobs that transmit image data to external equipment by email or the like, and facsimile transmission jobs that transmit image data as a facsimile. However, it is not limited to this.

When there are no executable jobs pertaining to reading a document (No in step S13), the job executor 214 then determines whether or not there is a job among the jobs pertaining to printing that can be executed (step S15). Examples of jobs pertaining to printing include print jobs that acquire print data from the outside and print the print data, and facsimile reception jobs that print received facsimile data. However, it is not limited to this. Although a copy job is a job pertaining to printing, in the example shown in FIG. 4, and for the purposes of the determination in step S13, it is determined as being a job pertaining to reading a document.

When there are no executable jobs pertaining to printing (No in step S15), the job executor 214 returns the processing to step S11 described above, and waits for a job to be registered in the job queue. In the determination of step S13 described above, when it is determined that there is an executable job that is a job pertaining to reading a document, the controller 210 serving as the job executor 214 acquires user identification information of a user authentication performed when an execution request for the job was accepted and the job was registered in the job queue (step S17). The user identification information is information that identifies which user a job is for, and a typical example is a user ID and a password. However, it is not limited to this. The user identification information is not limited to information that identifies the user as an individual, and may also be information that, for example, identifies a specific department or group. Furthermore, for example, when the image processing devices are a small, desk-side devices used by individuals, because the image processing devices themselves can be said to correspond to individual users, user identification information is not used as information about a job. In this case, the processing of step S17 is omitted.

Figure 8:
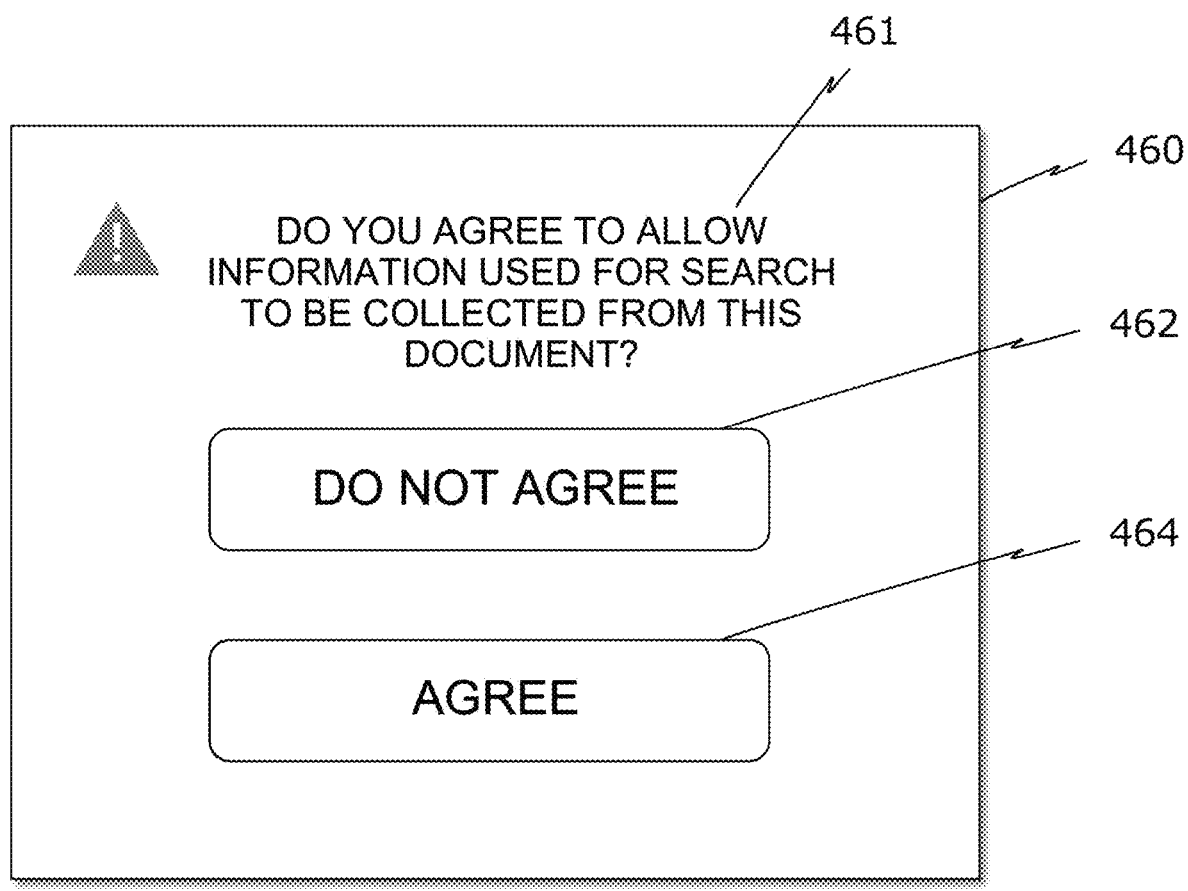
FIG. 8 is an explanatory diagram showing an example of a search usage confirmation screen displayed on the operation unit shown in FIG. 2 or FIG. 3.

The controller 210 serving as the job executor 214 reads an image of the one or more documents of the job. The controller 210 serving as the document image processor 222 processes the read document image and generates image data (step S19). Then, the controller 210 serving as the search usage permission selector 216 causes the user to select whether or not performing a search is permitted using extracted information, which is obtained by extracting information about at least one of characters and images from the generated image data (step S21). FIG. 8 is an explanatory diagram showing an example of a search usage confirmation screen that the search usage permission selector 216 displays on the operation unit 240 in the processing of step S21. The search usage confirmation screen 460 shown in FIG. 8 displays a confirmation message 461, such as "Do you agree to allow information used for search to be collected from this document?". As options for a user response, an operation made with respect to one of a [Do not agree] key 462 and an [Agree] key 464 is accepted.

When the operation controller 212 recognizes that the [Do not agree] key 462 has been touched, the search usage permission selector 216 advances the processing shown in FIG. 4 to step S27, and executes the job without extracting information from the image data (step S27), and completes the job. On the other hand, when the operation controller 212 recognizes that the [Agree] key 464 has been touched on the search usage confirmation screen 460 shown in FIG. 8, the search usage permission selector 216 performs the following processing. In the example shown in FIG. 2, in the mode where the image processing device 200 includes the information extractor 226 (second embodiment), the controller 210 serving as the information extractor 226 extracts information about at least one of characters and images from the generated image data (step S23). Note that, in the case of the base configuration where the server information extractor 326 extracts the information (first embodiment), the information extractor 226 does not exist, and this is represented by a chain line in FIG. 2. In addition, the processing of step S23 in FIG. 4, which corresponds to the processing of the information extractor 226, is also represented by a chain line. The representation by a chain line holds the same meaning for the other components and processing.

Figure 10:
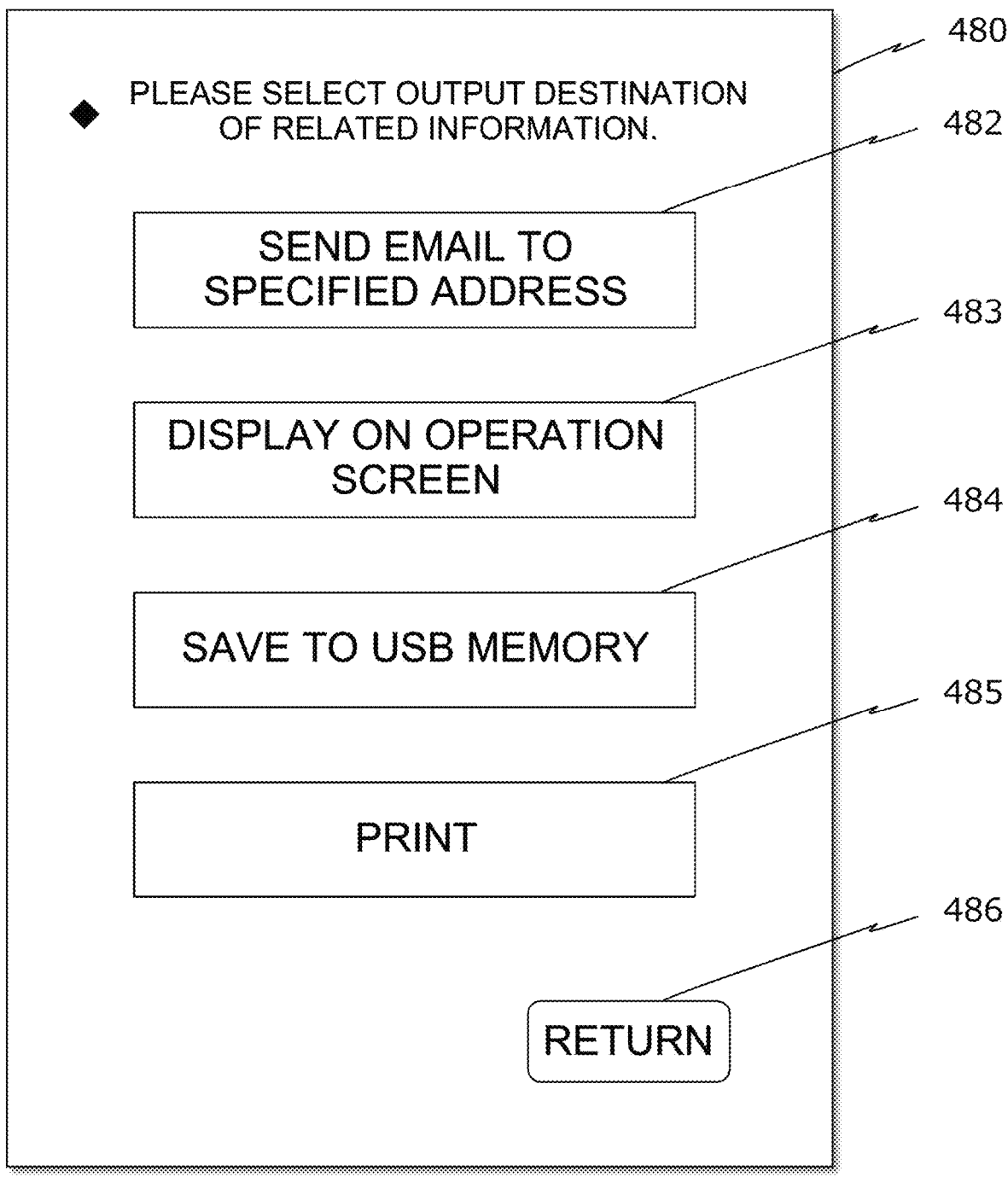
FIG. 10 is an explanatory diagram showing an example of an output selection screen displayed on the operation unit shown in FIG. 2 or FIG. 3.

Then, the controller 210 serving as the extracted information provider 218 transmits the image data to the server 300 in association with the user identification information (step S25). In the case of the second embodiment, the extracted information is further transmitted in association with the image data. Then, the job is executed (step S27) and completed. FIG. 7 shows a state where image data is output from the image processing device 200 as scan data Ds and transmitted to the image processing device 401, being the transmission destination, and a scan image 450 is displayed on the screen of the information processing device 401. Furthermore, FIG. 10 shows a state where the scan data Ds is transmitted to the server 300 as an extraction source image.

A case will be described where, in the determination of step S15, it is determined that there is a job that can be executed, and is a job pertaining to printing. The controller 210 serving as the job executor 214 acquires user identification information of a user authentication performed when an execution request for the job was accepted and the job was registered in the job queue (step S31). The user identification information is the same as that described in the processing of step S17 above. The controller 210 serving as the job executor 214 loads the print data of the job and generates image data (step S33).

Then, the controller 210 serving as the search usage permission selector 216 causes the user to select whether or not performing a search is permitted using extracted information, which is obtained by extracting information about at least one of characters and images from the generated image data (step S35). The processing performed by the search usage permission selector 216 and the search usage confirmation screen 460 are the same as that already described in steps S21 and S25. When a search using the extracted information is permitted, the image data is transmitted to the server 300 in association with the user identification information (step S39). In the case of the second embodiment, the extracted information is further transmitted in association with the image data. Then, the job is executed (step S41) and completed.

The foregoing is an example of the processing that executes a job shown as shown in the flowchart in FIG. 4. Although it has been described that the search usage permission selector 216 displays the search usage confirmation screen 460 on the operation unit 240 of the image processing device 200, it is not limited to this. It is possible to display the same screen as the search usage confirmation screen 460 on an information processing device used by the user such that the user makes a selection (fourth embodiment). Furthermore, as another embodiment, when a setting is accepted for a first time on the search usage confirmation screen of the processing of step S21 and step S31 shown in FIG. 4 (see FIG. 8), the search usage permission selector 216 may save the setting in the data storage 230 in association with the user identification information. When the next job is executed, the setting saved in association with the user identification information is read, and processing is performed according to the setting. This eliminates the need for the user to perform an operation that selects whether they agree/do not agree with the use of extracted information each time a job is executed. At the time of the first operation, or after the setting saved in the data storage 230 is deleted as a result of the user performing a predetermined operation, the search usage permission selector 216 displays the search usage confirmation screen such as that shown in FIG. 8 on the operation unit 240, and accepts a user setting (fifth embodiment).

Figure 5:
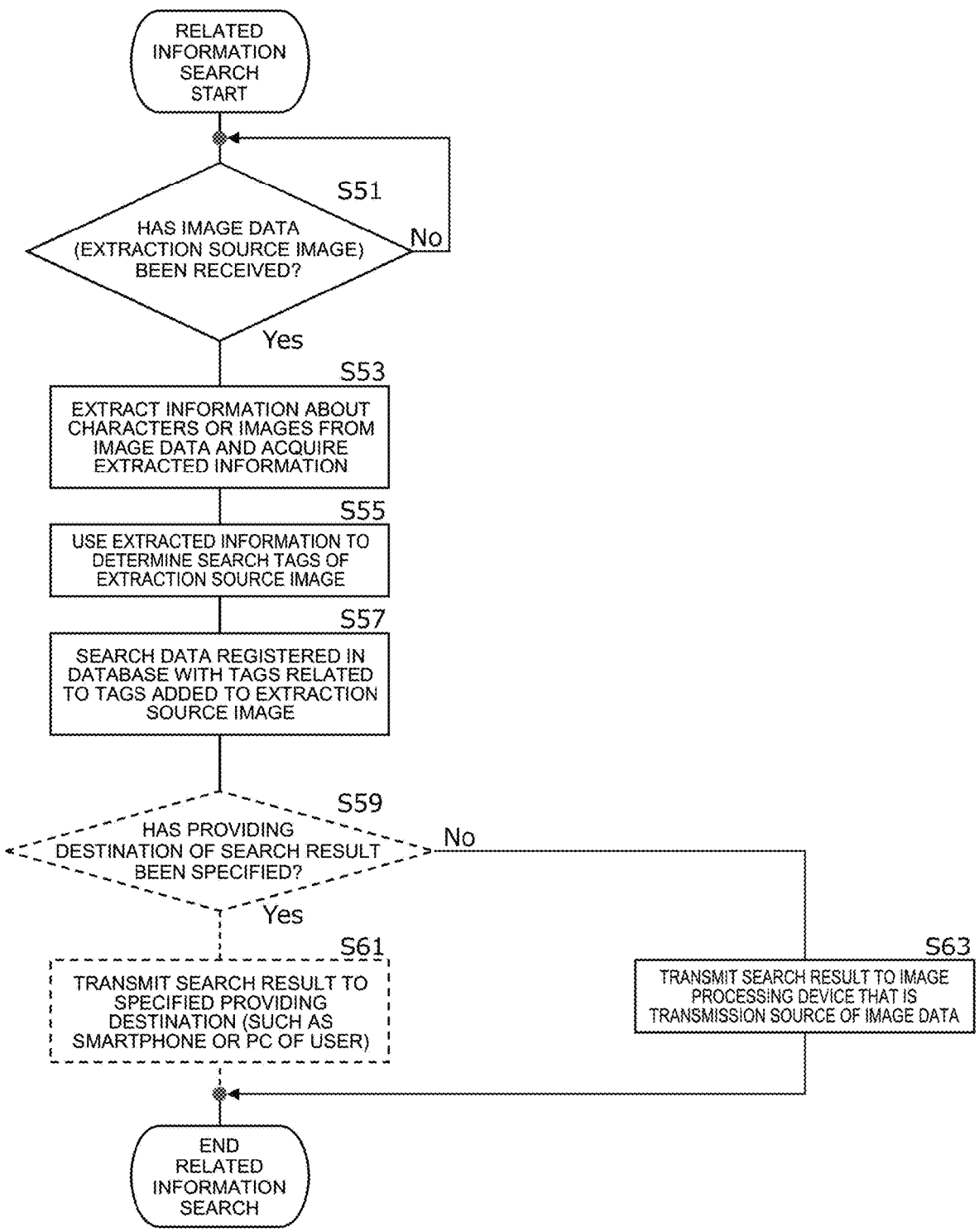
FIG. 5 is a flowchart showing an example of the processing by which the data storage device shown in FIG. 1 searches for related information.

Next, the processing performed by the server 300, being a data storage device, will be described. FIG. 5 is a flowchart showing an example of the processing by which the server 300 shown in FIG. 2, or more specifically, the server controller 310, searches for related information. As shown in FIG. 5, when the server controller 310 receives image data from the image processing device 200 (step S51), the server controller 310 serving as the server information extractor 326 extracts information about at least one of characters and images from the received image data (step S53). The image data received here is the image data provided to the server 300, which is a data storage device, in the processing of step S25 or step S39 shown in FIG. 4. In the second embodiment, the information extractor 226 extracts information from the image data to the image processing device 200 instead of the server information extractor 326 of the server 300. Further, because the extracted information is provided in association with the image data, the processing of step S53 of FIG. 5 is omitted.

Next, the server controller 310 serving as the related information searcher 312 preferably uses the related information to determine the tags used in a search. A tag is known as information that serves as a label attached to computer data to identify the structure or content. A tag according to the present disclosure is a tag used in a search. When a search is performed in which search targets (objects) have a common feature and a tag corresponding to the common feature is added in advance, the objects having the common feature (trend) are extracted by searching for the objects that have the predetermined tag added thereto. As a result, the search can be executed accurately in a short time.

A tag may be added with respect to the entire image data, or part of the image data. For example, a tag may be added with respect to a specific page, a specific portion, a specific document, or a specific image included in the image data. Therefore, the target of a search may be the entire image data, but it is not limited to this, and may be part of the image data. According to such a mode, as a result of each user adding tags representing attributes to the images of the jobs that have been previously executed, and then registering the images in the database, it is possible to find the images of past jobs that are related to the tags of the images of the job being executed next as related information. Because the related information is searched based on the execution history of each user, it is possible to provide information having a high relevance and is suited to the tendencies of each user.

In terms of which types of tags are added, or are not added, to the different types of extracted information, for example, tags that have a high usage frequency among the tags that are published for a service or on a site may be adopted, and the tags may be deleted, edited, or added. The people that are capable of deleting, editing, or adding the tags may be at least one of a designer, administrator, or user of the related information search system. Although the extracted information can be directly used as the tags, when the number of added tags is too large, the search processing load increases. Therefore, it is preferable that the extracted information is selectively used or integrated as the tags used in a search.

The database 306 stores extraction source image data to which tags have been added, and which is associated with user identification information. The related information searcher 312 uses the search tags determined from the image data of a document or print data of the executed job, and searches the data registered in the database 306. That is, a search is performed for data in which the related search tags have been added thereto (step S57). As a result of the search, the related information that relates to the current job is found from within the data that has been registered in the database from jobs that have previously been executed by the user. According to such a mode, it is possible to find and provide related information to each user by searching a database that has already been registered using the tags of the extraction source image data associated with the user identification information. FIG. 7 shows an example in which the related information Dr1 is found from within the data registered in the database 306.

Furthermore, a mode can also be considered in which the related information searcher 312 searches external data in addition to searching the database 306 (sixth embodiment). For example, the data on the Internet can be searched. The search can be performed using a known search engine. According to such a mode, it is possible to find related information that is related to the extracted information by searching other external data in addition to the database pertaining to the jobs that the user has previously executed. FIG. 7 also shows an example where, in a sixth embodiment in which search tags are used to search for external data other than the database 306, the related information Dr2 is found from within the external data.

For example, suppose that the extraction source image data is a newspaper article about human resources regarding the appointment of the president of a company. The server information extractor 326 extracts keywords pertaining to the name of the newspaper that published the article, the name of the newspaper company, the type of article, and the like, from the extraction source image data. In addition, information such as the company name and the president's name published in the article is extracted. Moreover, photographic images published in the articles are extracted. The related information searcher 312 uses the extracted information to determine the tags used in a search. For example, the newspaper company name, the article classification (company human resources), the company name, the person's name, and the photographic images are added as the tags used in a search. Then, the database 306 is searched using the tags added to the extraction source image data, and the related information Dr1 is found. Furthermore, the tags are used to search the Internet, and the related information Dr2 is found. Note that a configuration in which the search tags are used to search data other than the database 306 is not included in the base flow (first embodiment). Therefore, in the first embodiment, only the related information Dr1 is found, and the related information Dr2 is not found.

The base configuration of the present disclosure is a mode in which the server controller 310 transmits the search result of the related information to the image processing device 200, and after receiving the search result, the related information provider 219 of the image processing device provides the related information to the user. FIG. 7 shows an example in which the related information Dr1 and Dr2 that has been found is transmitted from the server 300 to the image processing device 200. However, a mode is also possible in which the server 300 directly provides the related information to the user (seventh embodiment). In this case, the server 300 includes the server related information provider 314. Further, it is determined whether or not a providing destination of the search result has been transmitted, for example, to the server 300 with the image data in step S51 (step S59). When the server controller 310 has acquired the providing destination of the search result (Yes in step S59), the server related information provider 314 transmits the search result to the user (step S61). The transmission destination is, for example, an information processing device such as a smartphone or PC used by the user. Then, the processing is completed.

On the other hand, in the determination of step S59, if the server controller 310 has not acquired a providing destination of the search result (No in step S59), the server controller 310 transmits the search result to the image processing device 200 (step S63) and completes the processing. The same applies to a case where the server controller 310 does not include the server related information provider 314 (base configuration of the first embodiment). The foregoing is an example of the related information search processing shown in FIG. 5. Next, the processing performed by the image processing device 200 after receiving the related information from the server 300 will be described.

Figure 6:
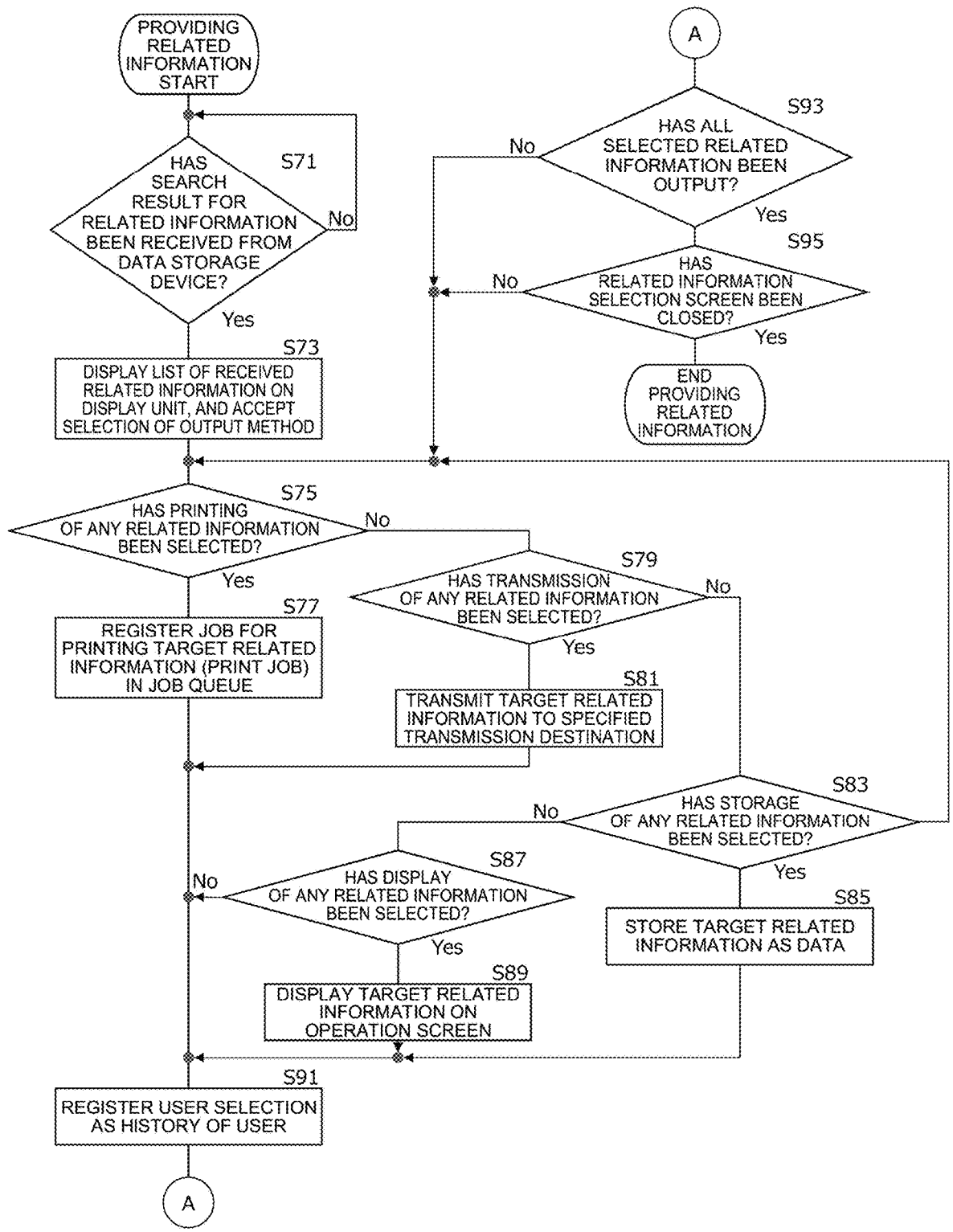
FIG. 6 is a flowchart showing an example of the processing by which the image processing device shown in FIG. 1 provides a user with related information.

FIG. 6 is a flowchart showing an example of processing by which the image processing device 200 provides the related information received from the server 300 to the user. As shown in FIG. 6, when the search result for related information is received from the server 300 (Yes in step S71), the controller 210 serving as the related information provider 219 displays the received related information on the operation unit 240. Here, the related information provider 219 is provided with one or more pieces of information. When a plurality of pieces of related information are provided, the related information provider 219 displays the headings of the related information that has been received. Because not all the related information is useful information for the user, the user selects the related information that is required. Furthermore, for the selected related information, the mode of providing the related information to the user is accepted (step S73).

Figure 9:
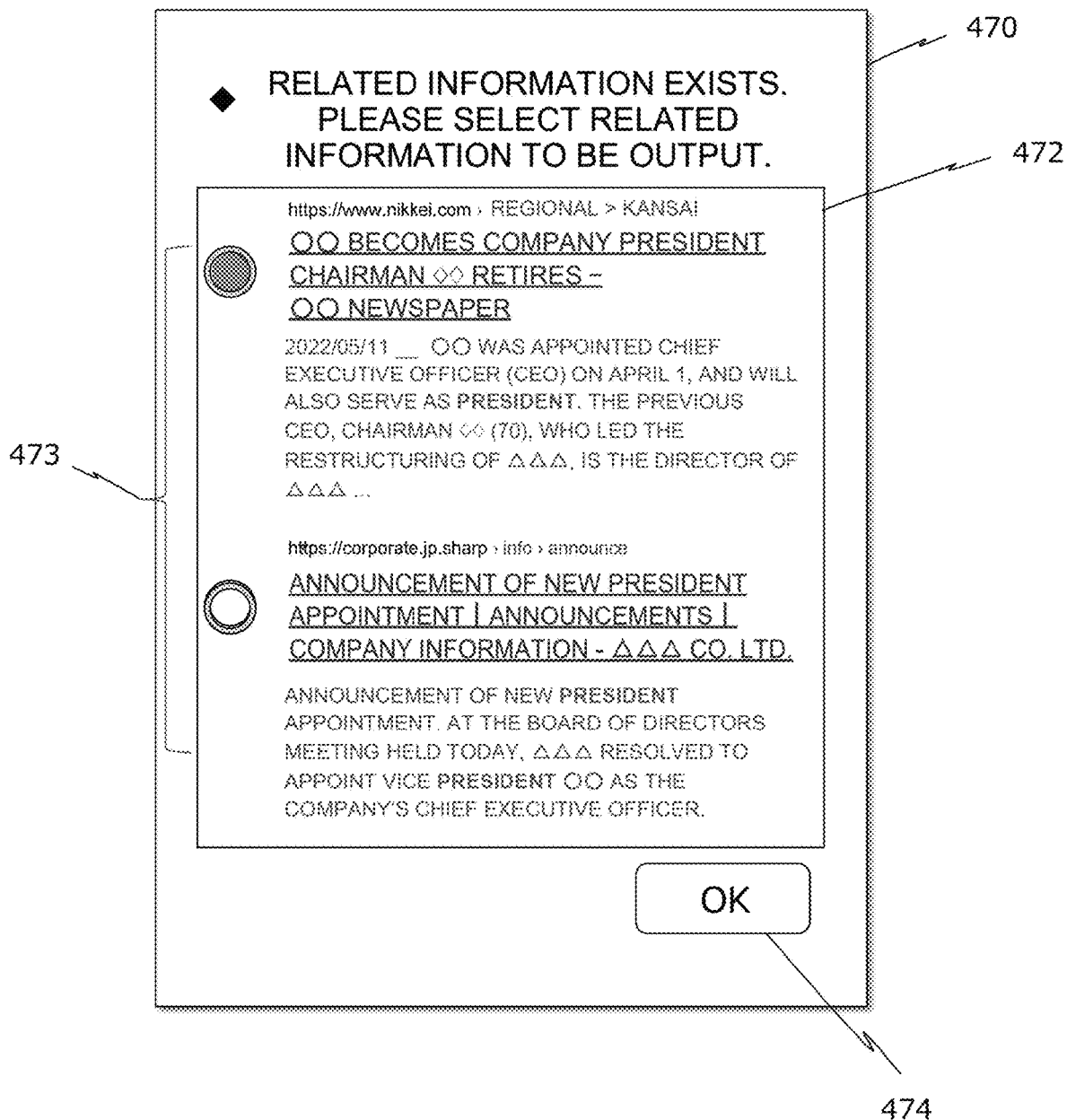
FIG. 9 is an explanatory diagram showing an example of a related information selection screen displayed on the operation unit shown in FIG. 2 or FIG. 3.

FIG. 9 is an explanatory diagram showing an example of a related information selection screen, which displays the headings of the related information on the operation unit 240 and accepts a selection made with respect to the related information. The related information selection screen 470 may be displayed as a pop-up on a screen of a job operation. The related information selection screen 470 shown in FIG. 9 includes a related information display field 472 that displays the headings of the related information, selection buttons 473 that accept a selection made with respect to each piece of related information, and an [OK] key 474. The selection buttons 473 are disposed on the left side of each piece of related information, and individually accept whether or not the piece of information has been selected. The related information whose selection button 473 is a black circle indicates a state of being selected and output. The related information whose selection button 473 is a white circle indicates a state of being not selected. When the user touches the selection button 473 in a non-selected state, the related information provider 219 recognizes that the related information has been selected, and displays the output selection screen 480 shown in FIG. 10.

The output selection screen 480 is a screen that accepts a selection by a user of the mode in which the selected related information is output. As shown in FIG. 10, the output selection screen 480 includes an [Email transmission] key that transmits an email containing the related information to a user-specified address, and a [Screen display] key 483 that displays the related information on the screen. Further, the output selection screen 480 includes a [Save data] key 484 that saves the related information to a USB memory connected to a USB connector (not shown) of the image processing device 200, and a [Print] key 485 that prints the related information. In addition, the output selection screen 480 includes a [Return] key 486 that returns the screen to the related information selection screen 470. When one or more pieces of related information are selected by the user, the mode of providing the related information to the user is accepted. The mode of providing the related information may be accepted for each piece of related information, or may be collectively received. In the flowchart shown in FIG. 6, it is assumed that the mode of providing the related information is accepted for each piece of related information that has been selected.

The related information provider 219 determines whether or not printing of the related information has been selected as the mode of providing any of the selected related information (step S75). When the [Print] key 485 of the output selection screen 480 is touched, the related information provider 219 recognizes that printing has been selected. When printing is selected (Yes in step S75), the related information provider 219 registers the job that prints the target related information in the job queue (step S77) and advances the processing to step S91.

In step S91, the related information provider 219 may register the output mode of the related information selected by the user as history of the user (step S91). This is referred to as an eighth embodiment. However, this is not included in the base configuration (first embodiment). Based on the history of the output mode of the related information, the order in which the option keys are disposed may be rearranged when subsequently displaying the output selection screen 480. Furthermore, when transmission is selected, the initial value of the email transmission destination may be presented based on the history, or it may be determined whether or not to display the initial value based on the history. The initial value may be presented when transmission is selected a large proportion of the time, and the transmission is to the same email transmission destination a large proportion of the time. According to such a mode, the mode in which the related information is provided to the user can not only be selected by the user, but it is also possible to leave a history of which mode the user used for reception when provided with the related information.

Next, the related information provider 219 determines whether or not the processing of providing the related information to the user has been performed for all of the selected related information (step S93). When the processing has not been performed for all of the related information (No in step S93), the processing returns to the determination of step S75 described above.

In the determination of step S75 described above, when printing is not selected (No in step S75), it is determined whether or not transmission of the related information has been selected as the next providing mode (step S79). When the [Email transmission] key 482 of the output selection screen 480 is touched, the related information provider 219 recognizes that transmission has been selected. When transmission of the related information is selected (Yes in step S79), the related information provider 219 transmits the target related information to the specified transmission destination (step S81), and advances the processing to step S93. The user may be requested to input the transmission destination when transmission of the related information is selected. Alternatively, an input of the transmission destination may be accepted at the same time as when user authentication of the job execution is performed, or when a search for related information using extracted information is permitted (steps S21 and S35 shown in FIG. 4). FIG. 7 shows an example where transmission of the related information Dr1 and Dr2 has been selected, the related information Dr1 and Dr2 has been transmitted from the image processing device 200 to the information processing device 401, which is the transmission destination, and the scan image 450 is displayed on the screen of the information processing device 401.

In the determination of step S79 described above, when transmission of the related information is not selected (No in step S79), it is determined whether or not storage of the related information has been selected as the next providing mode (step S83). When the [Save data] key 484 of the output selection screen 480 is touched, the related information provider 219 recognizes that storage has been selected. When storage of the related information is selected (Yes in step S83), the related information provider 219 stores the target related information in the specified storage destination as data (step S85), and advances the processing to step S93. In the determination of step S83 described above, when storage of the related information is not selected (No in step S83), it is determined whether or not display of the related information has been selected as the next providing mode (step S87). When the [Screen display] key 483 of the output selection screen 480 is touched, the related information provider 219 recognizes that display has been selected. When display of the related information is selected (Yes in step S87), the related information provider 219 displays the target related information on the operation unit 240 (step S89), and advances the processing to step S93.

In the determination of step S87 described above, when display of the related information is not selected (No in step S87), the related information provider advances the processing to step S93, and determines whether or not all of the selected related information has been output. If there is related information that has been selected whose output processing has not yet been performed (No in step S93), the related information provider 219 advances the processing to step S75 described above. In the determination of step S93 described above, when all of the related information has been output (Yes in step S93), the related information provider 219 subsequently determines whether or not the related information selection screen 470 has been closed as a result of the [OK] key 474 on the related information selection screen 470 being touched (step S95).

If the related information selection screen 470 has been closed (Yes in step S95), the processing is completed. If the related information selection screen 470 has not yet been closed (No in step S95), the related information provider 219 advances the processing to step S75 described above. As described above, the selection of any one of printing, transmission, and storage is accepted as a mode of providing each piece of related information to the user. When all of the selected related information has been provided (Yes in step S93), the processing is completed. The foregoing is the processing shown in FIG. 6 pertaining to providing related information.

Modifications

Figure 11:
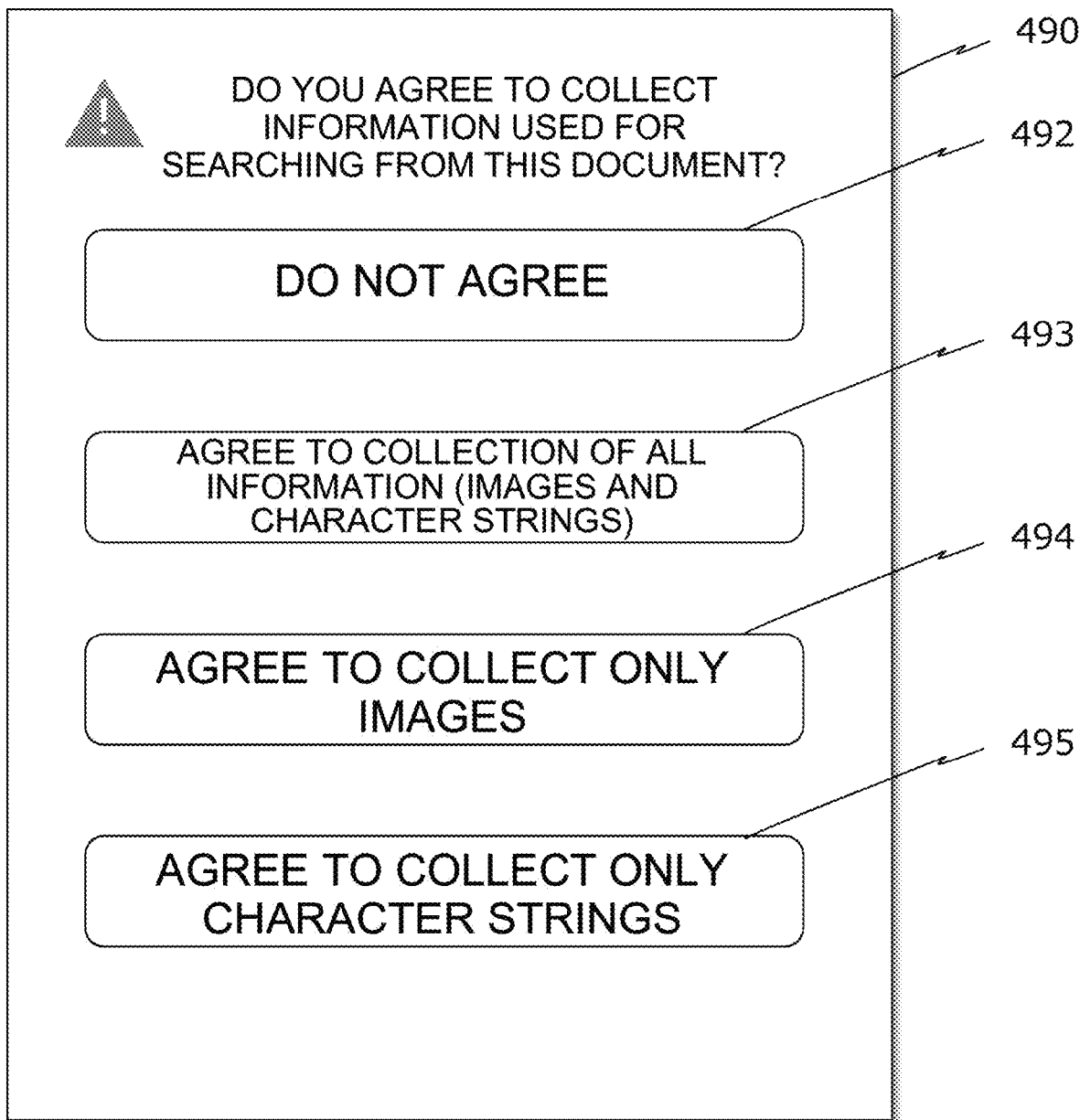
FIG. 11 is an explanatory diagram showing a different example to FIG. 9 of a search usage confirmation screen displayed on the operation unit shown in FIG. 2 or FIG. 3.

Here, several modifications to the processing flow described above will be described. In steps S21 and S35 shown in FIG. 4, when selecting whether or not performing a search is permitted using the extracted information, it is also possible specify the target of the permission in more detail. For example, a permission for extraction of information about characters and information about images for use in a search may be individually accepted. In this case, the search usage permission selector 216 displays the search usage confirmation screen 490 shown in FIG. 11 instead of the search usage confirmation screen 460 shown in FIG. 8. The search usage confirmation screen 490 shown in FIG. 11 includes the same [Do not agree] key 492 as the search usage confirmation screen 460 in FIG. 8, and includes an additional three keys. These are an [Agree to all] key 493 that corresponds to the [Agree] key 464 in FIG. 8, an [Agree to images only] key 494, and an [Agree to characters only] key 495. According to such a mode, it is possible to accept a user selection of whether or not usage of the extracted information is permitted for one of information about characters and information about images in the extracted information.

Furthermore, when selecting whether or not a search using the extracted information is permitted, the permission selection may be accepted according to the type of job. According to such a mode, for example, it is possible to accept a user selection of whether usage of the extracted information is permitted for each type of job, such as copy jobs, print jobs, and scan jobs. Alternatively, when selecting whether or not a search using the extracted information is permitted, a permission selection that specifies the job or page may also be possible. According to such a mode, it is possible to accept a user selection of whether or not usage of the extracted information is permitted, for example, for a specific job, or for one or more specific pages of a certain job.

Further, even in a case where a search using extracted information has been permitted in steps S21 and S35 shown in FIG. 4, the usage permission may be reconfirmed when the extracted information that has been extracted according to the selection in step S53 includes specific information that has been registered in advance. Note that, in the second embodiment, the extracted information that has been extracted in steps S23 and S37 shown in FIG. 4 includes specific information. The specific information may be, for example, character strings such as "confidential", secret", or "top secret", or images such as specific imprints or specific signatures. The server information extractor 326 (the information extractor 226 in the case of the second embodiment) determines whether or not the extracted information that has been extracted includes one or more pieces of information that have been registered in advance. When it is determined that any pieces of information that have been registered in advance are included in the extracted information, the controller 210 of the image processing device 200 is notified. After being notified, the controller 210 performs reconfirmation with the user. The people that are capable of registering the specific information may be at least one of a designer, administrator, or user of the related information search system. Furthermore, it is preferable that the information that has been registered can be added, edited, and deleted.

Figure 12:
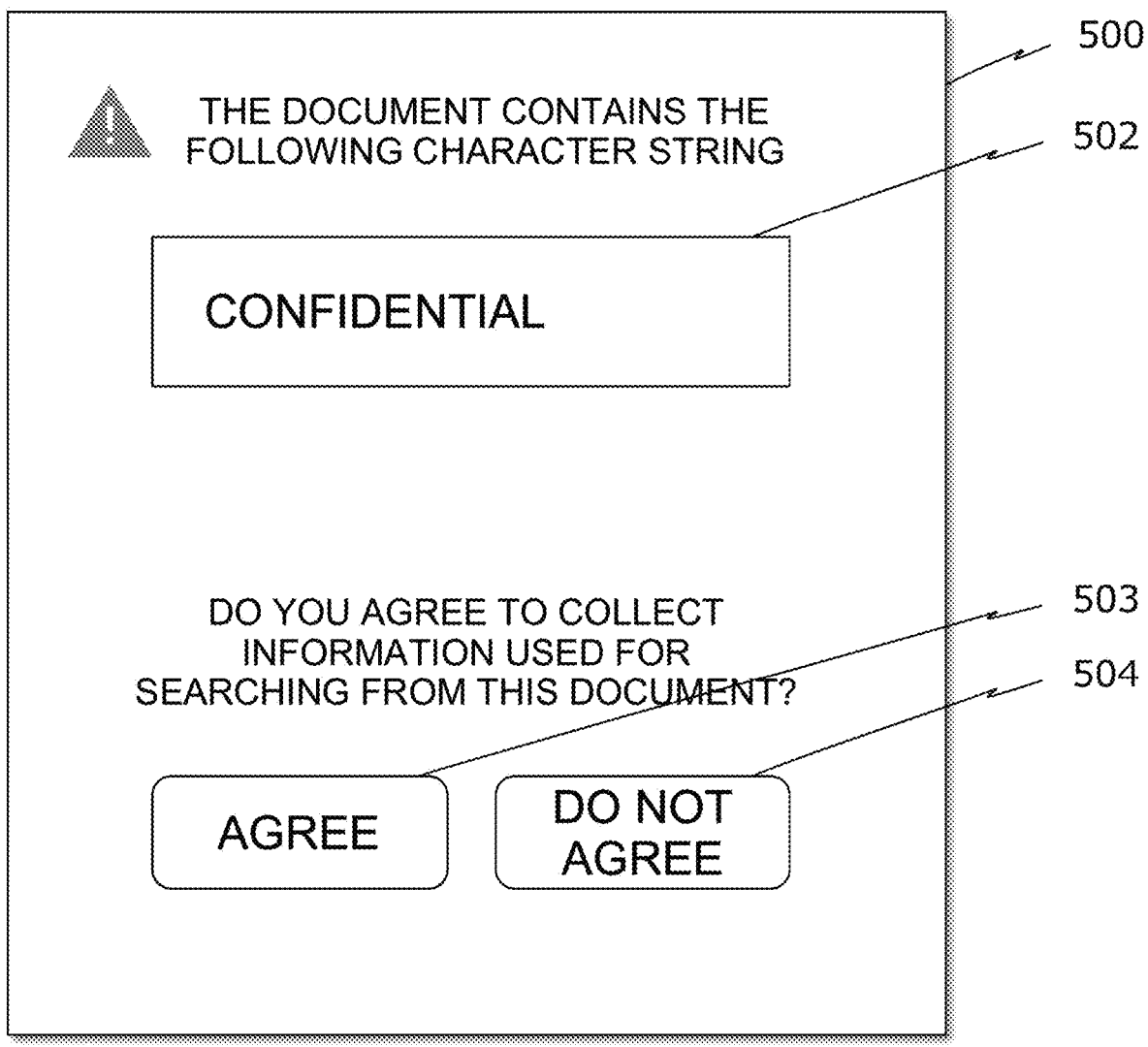
FIG. 12 is an explanatory diagram showing an example of a search usage reconfirmation screen displayed on the operation unit shown in FIG. 2 or FIG. 3.

FIG. 12 is an explanatory diagram showing an example of a search usage reconfirmation screen displayed on the operation unit at that time by the controller 210. The search usage reconfirmation screen 500 shown in FIG. 12 includes a specific information display field 502, an [Agree] key 503, and a [Do not agree] key 504. The specific information display field 502 in FIG. 12 shows that it has been determined that the extracted information includes a character string "confidential", which has been registered in advance. After presenting the information to the user, the user selects whether or not to perform a search using the extracted information. When the [Agree] key 503 is touched, a search is subsequently performed using the extracted information. When the [Do not agree] key 504 is touched, the job execution is completed without performing a search. According to such a mode, when the extracted information includes specific information that has been registered in advance, such as the character string "secret" or "confidential", data protection can be performed with more certainty by requesting the user to reconfirm the usage permission of the extracted information.

First Mode of Performing Natural Language Processing Using Extracted Information In recent years, technologies using natural language processing techniques have been attracting attention. Natural language processing is a technique in which computers process words written or spoken by people. This is because advanced natural language processing has become possible due to remarkable advances in artificial intelligence (AI), especially in deep learning. In natural language processing, sentences are input into a "language model" made up of a huge number of sentences prepared in advance, and the subsequent words are predicted by artificial intelligence using the language model. When the language model is grown by repeating such learning and the natural language written or spoken by a person is processed by a computer, a situation is reached in which the computer responds as though it understands the words written or spoken by the person. In the present embodiment, a mode will be described in which a result is obtained by performing natural language processing on extracted information that has been extracted from image data pertaining to image processing.

Figure 13:
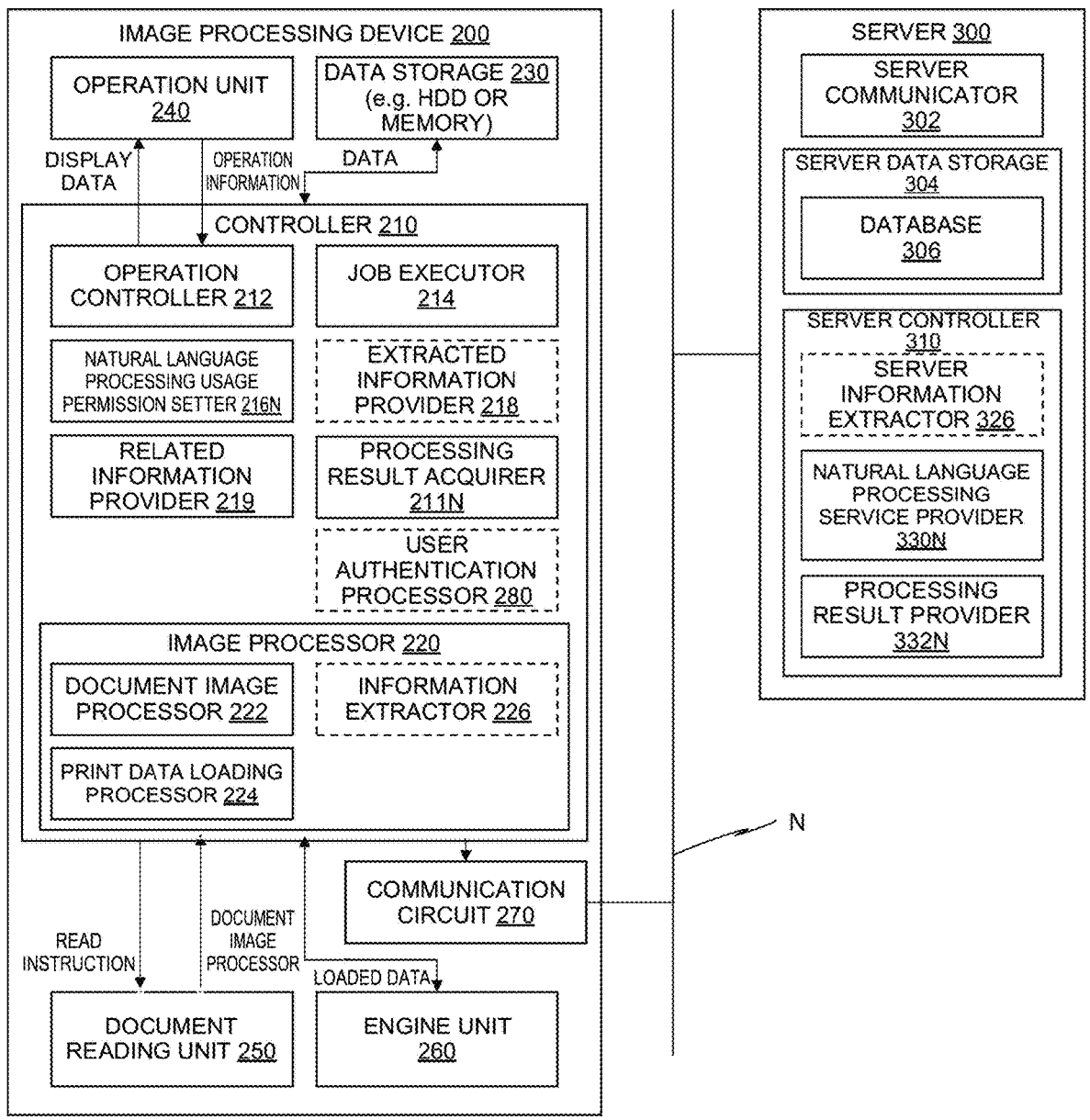
FIG. 13 is a block diagram showing a configuration example in which the image processing device according to the present disclosure has connected to a server that provides a natural language processing service.

FIG. 13 is a block diagram showing a configuration example in which the same image processing device 200 as that shown in FIG. 2 has connected to a server 300 that provides a natural language processing service. The components that correspond to those in FIG. 2 are denoted by the same reference numerals as those in FIG. 2. FIG. 13 is different to FIG. 2 in that the image processing device 200 includes a natural language processing usage permission setter 216N instead of the search usage permission selector 216 in FIG. 2. An additional difference is that the image processing device 200 includes a processing result acquirer 211N, which is not in FIG. 2, that acquires the result of natural language processing. A user authentication processor 280, which is not in FIG. 2, may also be optionally provided. In addition, the server 300 is different in that includes a natural language processing service provider 330N instead of the related information searcher 312 in FIG. 2, and further includes a processing result provider 332N as an essential component instead of the server related information provider 314, which is optional in FIG. 2.

The natural language processing usage permission setter 216N accepts and stores a setting of whether or not providing extracted information to a natural language processing service is permitted. The processing result acquirer 211N acquires the result of natural language processing from the processing result provider 332N of the server 300. The optional user authentication processor 280 performs processing that authenticates a user that gives an instruction to the image processing device 200 for execution of a job. The natural language processing service provider 330N of the server 300 executes natural language processing using the extracted information provided from the extracted information provider 218 of the image processing device 200 or the server information extractor 326. Note that the processing of the natural language processing service may be included in the natural language processing service provider 330N, but a mode is also possible in which an external natural language processing service is used via the natural language processing service provider 330N. The processing result provider 332N provides the result of natural language processing performed by the natural language processing service provider 330N, or performed via the natural language processing service provider 330N to the processing result acquirer 211N of the image processing device 200.

Figure 14:
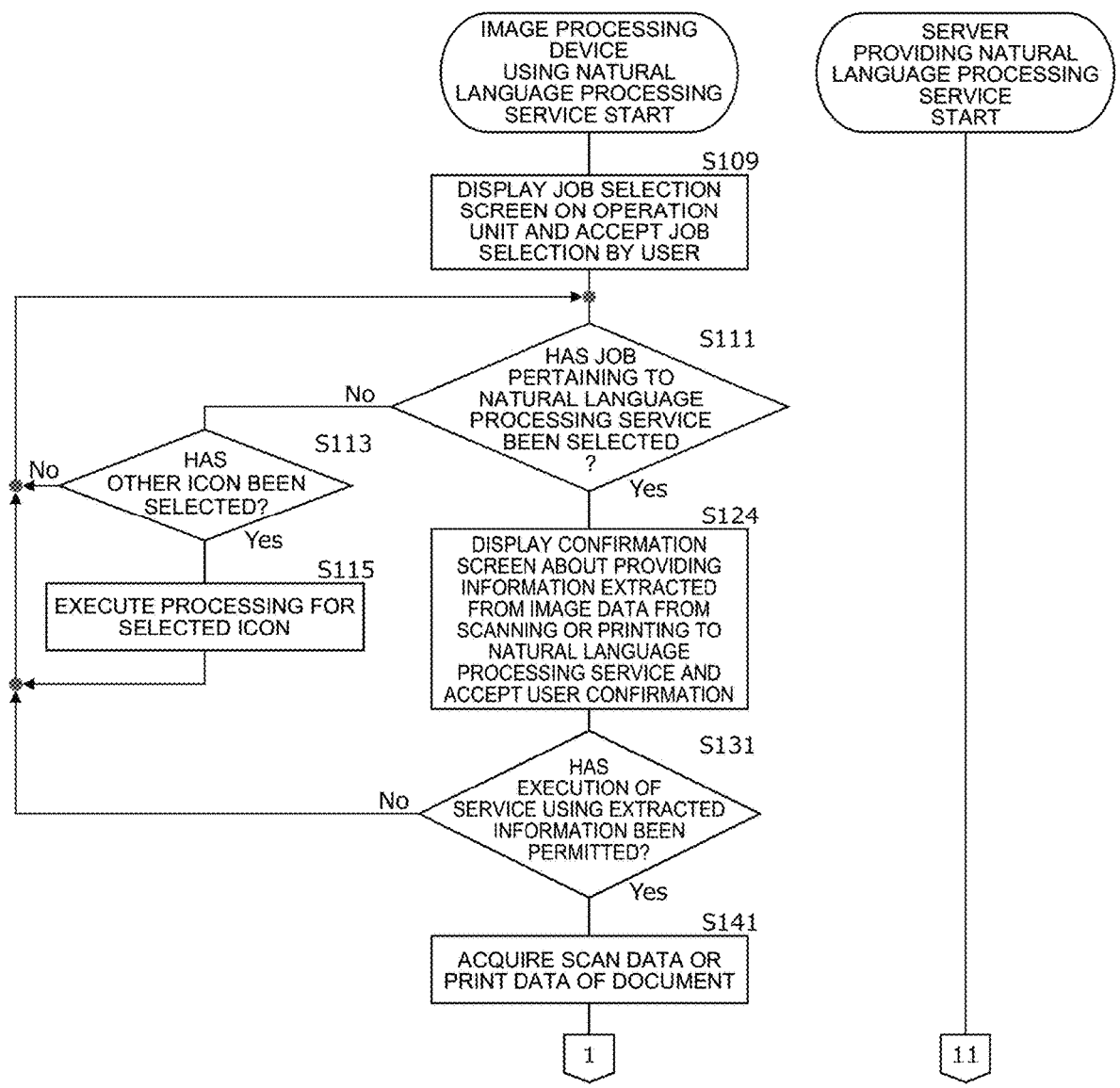
FIG. 14 is a first flowchart showing an example of the processing by which the image processing device shown in FIG. 13 executes a job pertaining to natural language processing.
Figure 15:
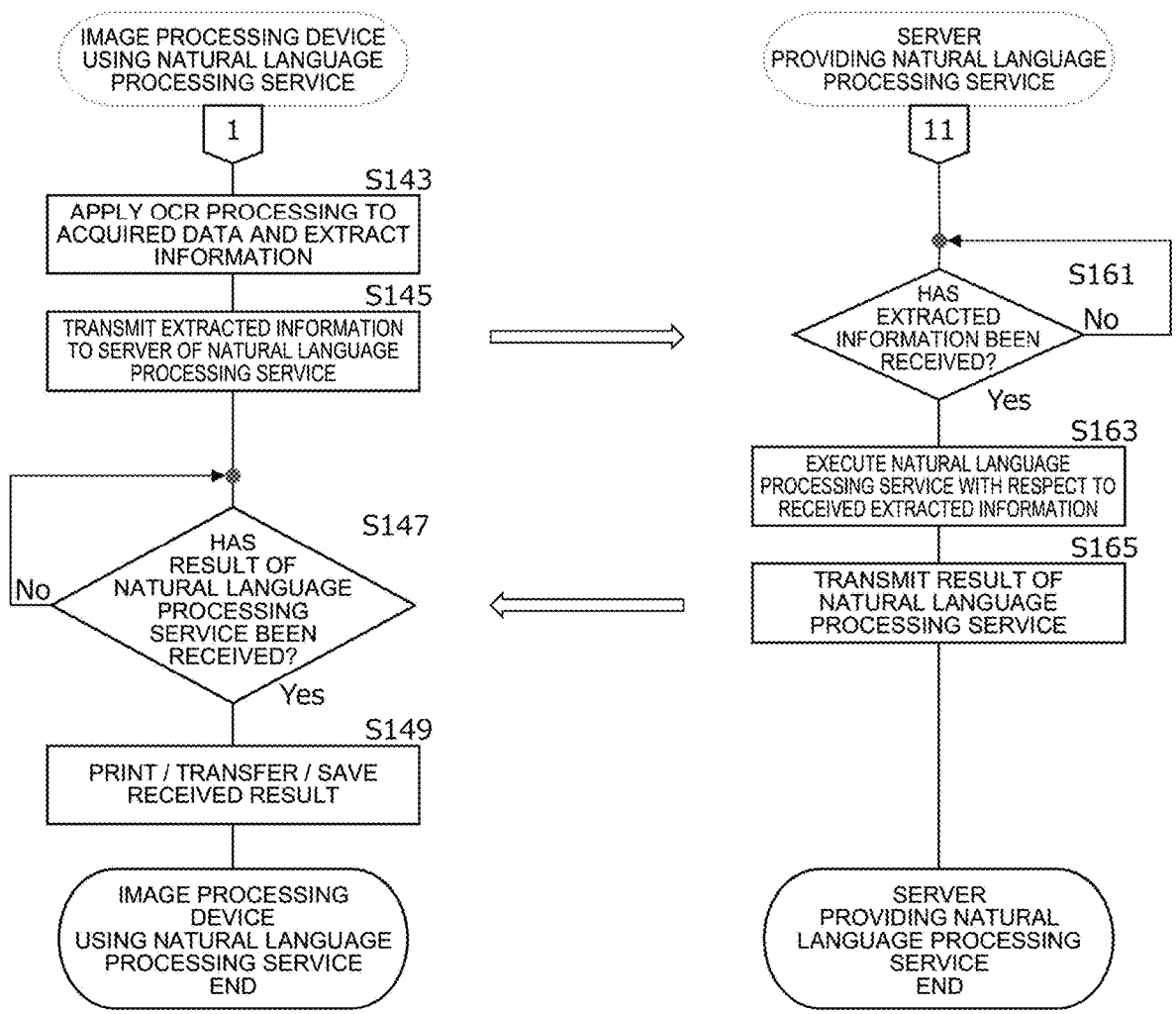
FIG. 15 is a second flowchart showing an example of the processing by which the image processing device shown in FIG. 13 executes a job pertaining to natural language processing.

Next, an example of the processing procedure of a job pertaining to natural language processing will be described. FIGS. 14 and 15 are a first flowchart showing an example of the processing by which the image processing device shown in FIG. 13 executes a job pertaining to natural language processing. In FIGS. 14 and 15, the left side represents the processing of the controller 210 of the image processing device 200, and the right side represents the processing of the server controller 310 of the server 300. In FIG. 14, the controller 210 of the image processing device 200 displays the job selection screen 160 shown in FIG. 16 on the operation unit 240, and accepts a selection made by the user of the job to be executed by the image processing device 200 (step S109).

Figure 16:
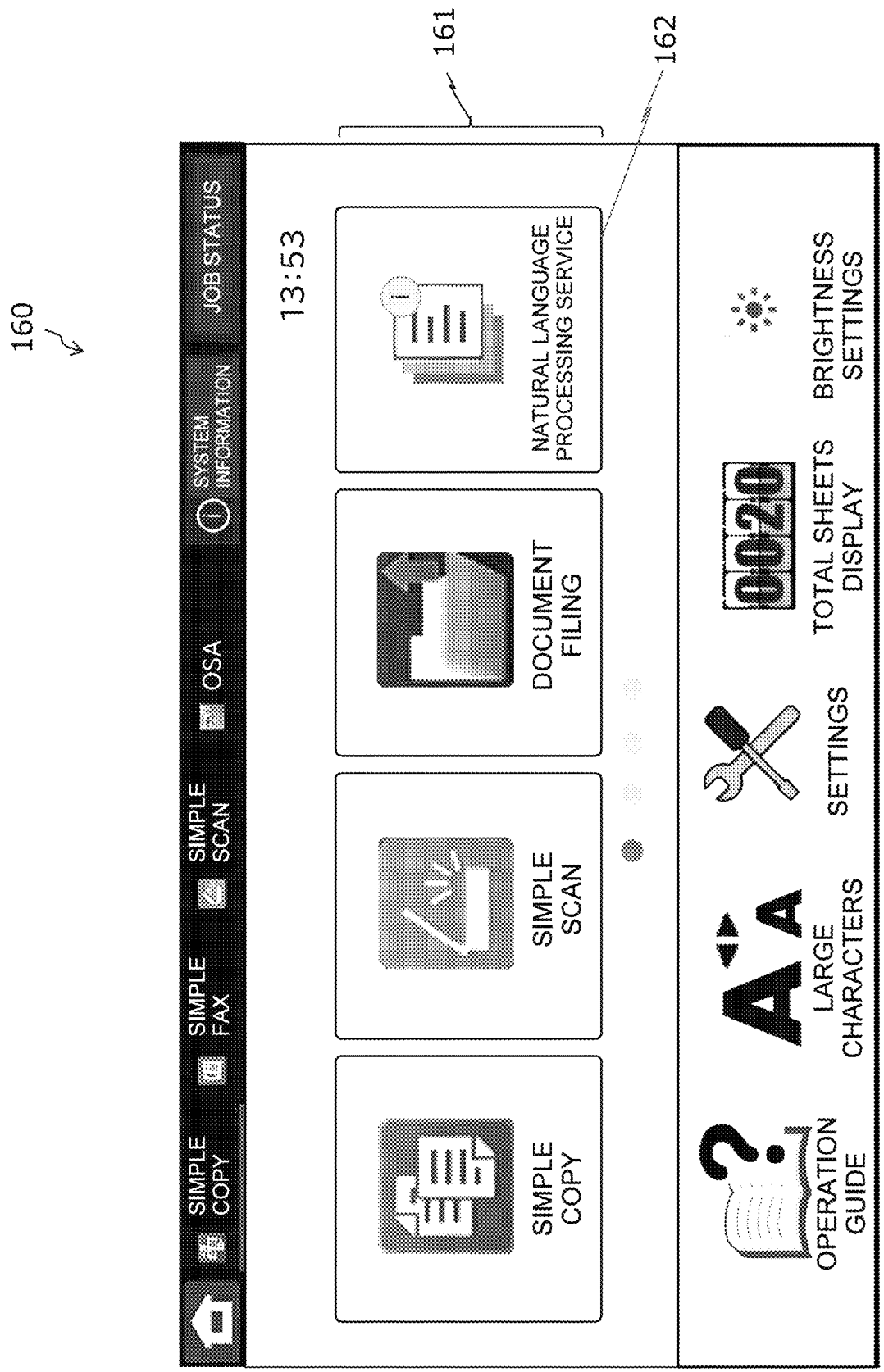
FIG. 16 is an explanatory diagram showing an example of a job selection screen displayed on the operation unit of the image processing device shown in FIG. 13.
Figure 17:
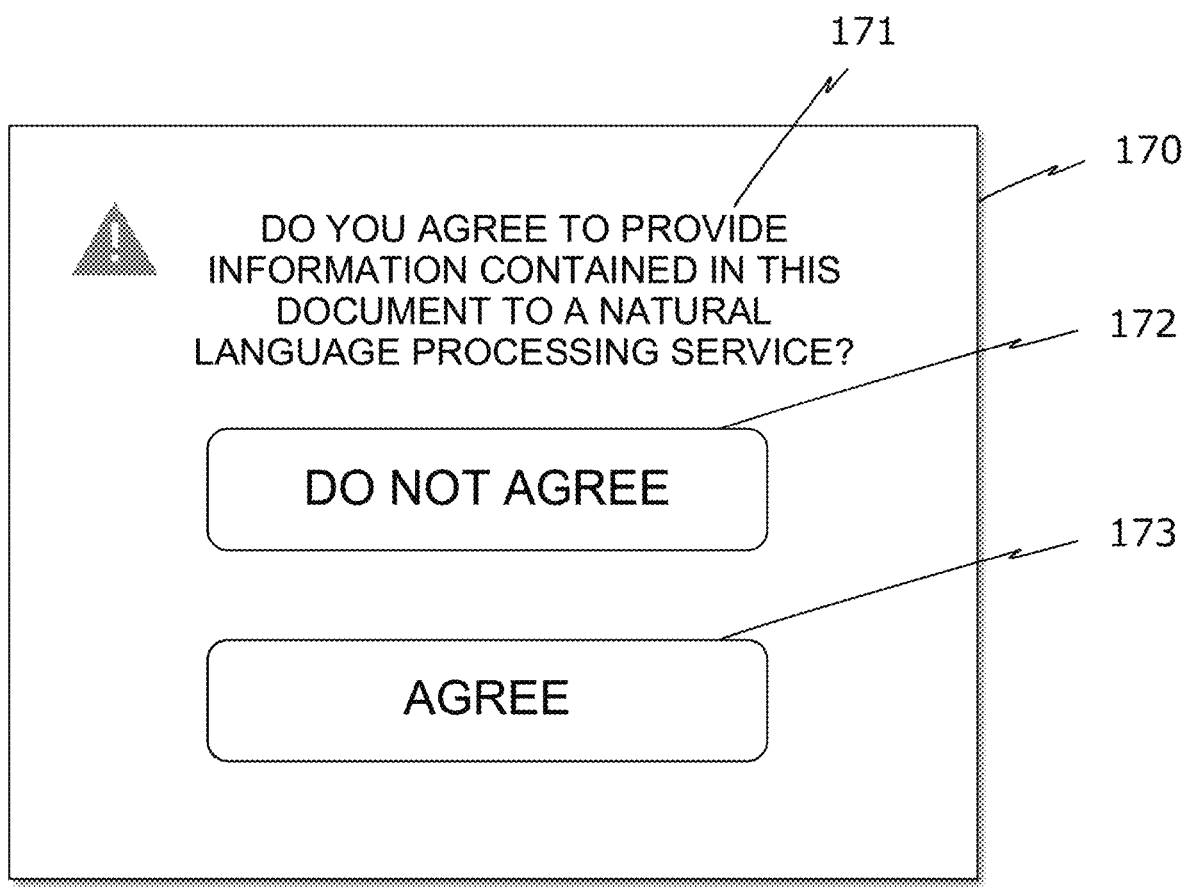
FIG. 17 is an explanatory diagram showing an example of an extracted information providing confirmation screen displayed on the operation unit by the natural language processing usage permission setter shown in FIG. 13.

FIG. 16 is an explanatory diagram showing an example of a job selection screen displayed on the operation unit 240 of the image processing device 200. The job selection screen 160 includes a job icon display area 161 in which icons for accepting a job selection are arranged. Below the job icon display area 161 is a function icon display area in which function icons that accept settings of various functions are arranged. As shown in FIG. 16, when a [Natural language processing service] icon 162 disposed in the job icon display area 161 is touched (Yes in step S111), the controller 210 serving as the natural language processing usage permission setter 216N executes the following processing as a response. That is, the extracted information providing confirmation screen 170 shown in FIG. 17 is displayed as a pop-up on the operation unit 240 (step S124). On the other hand, if another icon, that is, a job icon or a function icon other than [Natural language processing service] is selected (No in step S111), the controller 210 executes processing corresponding to the selected icon (step S115), and then returns the processing to step S111 described above. If none of the icons are selected and the processing is waiting for an operation (No in step S113), the processing returns to step S111 described above without doing anything.

The extracted information providing confirmation screen 170, which is displayed in response to operation of the [Natural language processing service] icon 162, displays a confirmation message 171 asking "Do you agree to provide information contained in this document to the natural language processing service?", a [Do not agree] key 172, and an [Agree] key 173. The controller 210 serving as the natural language processing usage permission setter 216N displays the extracted information providing confirmation screen 170 and accepts a confirmation operation made by the user (step S124). When the [Do not agree] key 172 is operated (No in step S131), the controller 210 returns the processing to step S111 described above without starting the execution of the job pertaining to the natural language processing service.

When the [Agree] key 173 is operated (Yes in step S131), the controller 210 serving as the image processor 220 acquires image data, that is, scan data or print data of the document of the job that the user has instructed the image processing device 200 to execute (step S141). Although the details of execution instructions and generation of image data of the jobs of an image processing device are known and will be omitted, the image processor 220 acquires print data of a print job or scan data of a scan job or a copy job. Further, in the mode in which the image processor 220 is provided with the information extractor 226, information is extracted from the acquired image data (step S143 shown in FIG. 15). As an example, character recognition processing is applied to image data to extract character information. Then, the controller 210 serving as the extracted information provider 218 transmits information that has been extracted from the image data to the server 300 providing the natural language processing service (step S145).

When the server controller 310 of the server 300 receives the extracted information from the image processing device 200 (Yes in step S161 shown in FIG. 15), the server controller 310 serving as the natural language processing service provider 330N executes the natural language processing service with respect to the received extracted information (step S163). The server controller 310 serving as the processing result provider 332N transmits the result obtained by executing the natural language processing service to the image processing device 200 (step S165). Unlike the mode in which the image processing device 200 side is provided with the information extractor 226, in the case of the mode in which the server 300 side is provided with the server information extractor 326, the image processor 220 may transmit the image data to the server 300 instead of the extracted information. When the image data is received from the image processing device 200 (Yes in step S161), the server controller 310 serving as the server information extractor 326 extracts information from the received image data. As an example, character recognition processing is applied to image data to extract character information. Then, the extracted information that has been extracted is provided to the natural language processing service provider 330N. The natural language processing service provider 330N executes a natural language processing service with respect to the extracted information that has been extracted (step S163). The server controller 310 serving as the processing result provider 332N transmits the result obtained by executing the natural language processing service to the image processing device 200 (step S165).

When the image processing device 200 receives the result of natural language processing from the server 300 (Yes in step S147 shown in FIG. 15), the controller 210 serving as the processing result acquirer 211N executes the following processing. That is, the received result is printed, transferred to an external device, or stored in the data storage 230 according to a setting that has been accepted in advance, or in response to a user instruction that has been accepted on a screen (not shown) (step S149). Then, the job pertaining to the natural language processing service is completed. The foregoing is the first mode of performing natural language processing using extracted information.

Figure 18:
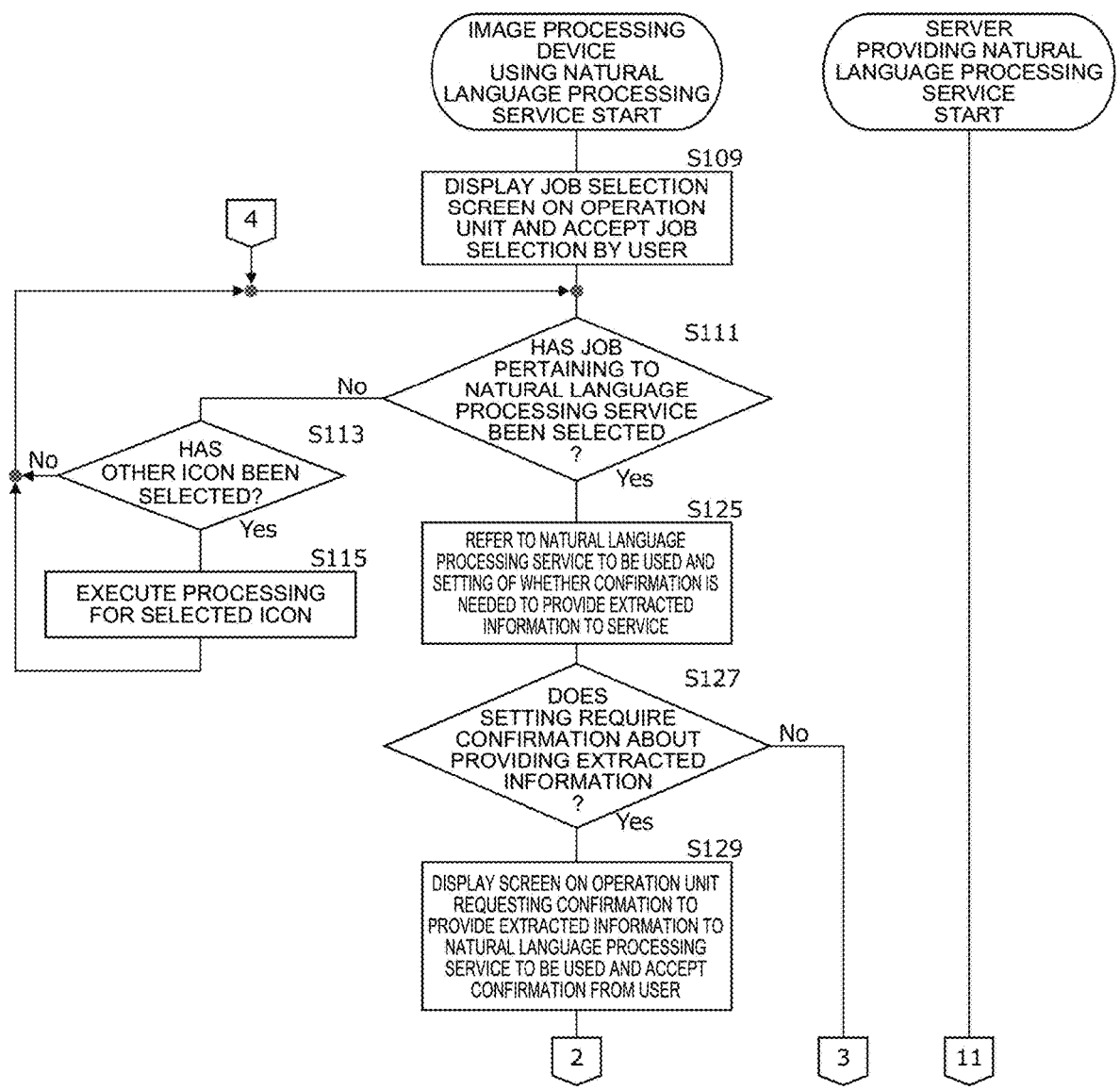
FIG. 18 is a first flowchart showing an example of processing different to that of FIGS. 14 and 15.
Figure 19:
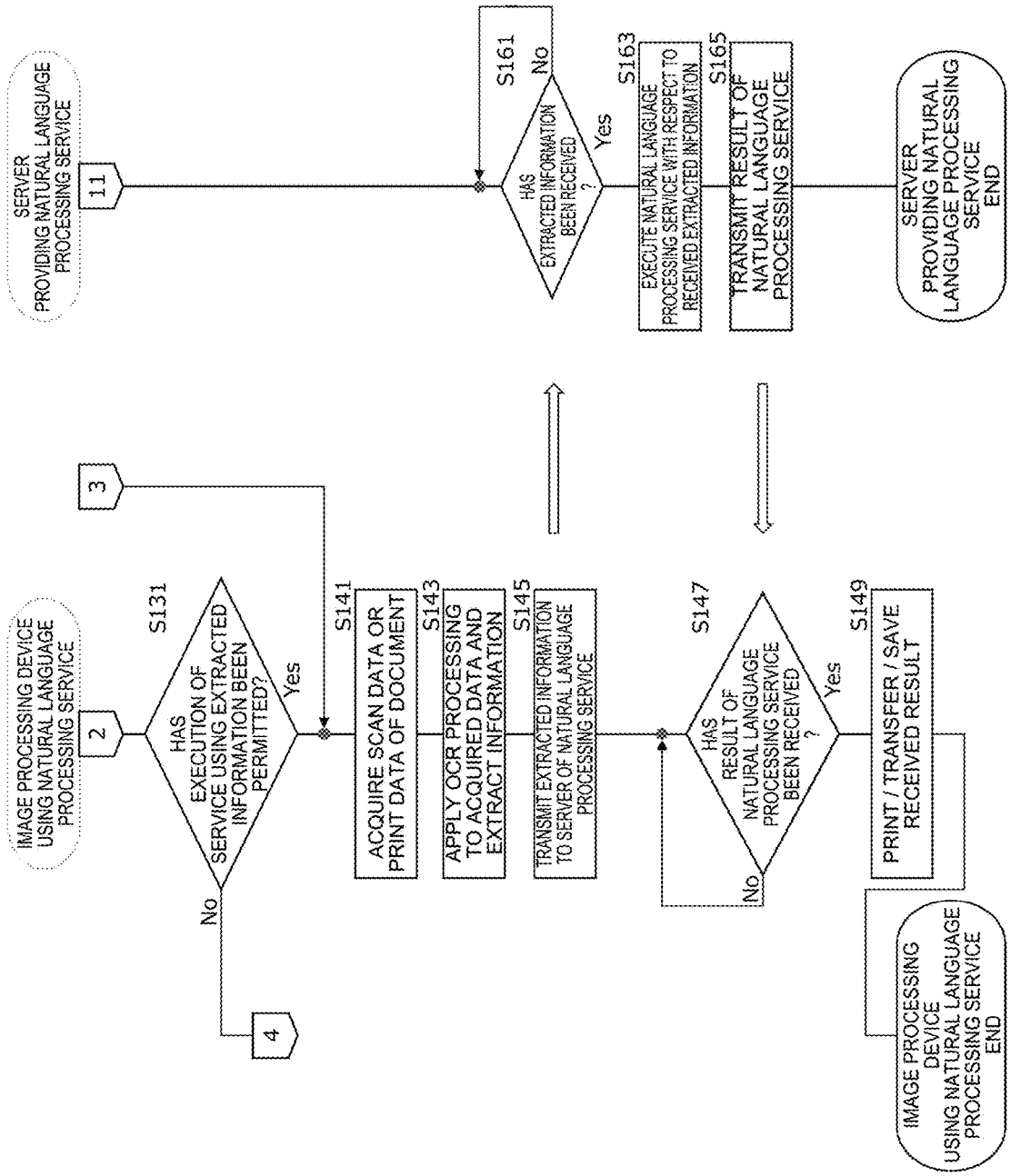
FIG. 19 is a second flowchart showing an example of processing different to that of FIGS. 14 and 15.

Second Mode of Performing Natural Language Processing Using Extracted Information A different example of the processing procedure of a job pertaining to natural language processing will be described. Various service providers offer different natural language processing services, and the number of such services is expected to increase further in the future. In the second mode, a plurality of natural language processing services are provided, and the image processing device 200 can set which natural language processing services are to be used. FIGS. 18 and 19 are flowcharts showing an example of processing different to that of FIGS. 14 and 15. In a similar manner to FIGS. 14 and 15, the left side represents the processing of the controller 210 of the image processing device 200, and the right side represents the processing of the server controller 310 of the server 300. The same processing as FIGS. 14 and 15 is denoted by the same reference numerals. Hereinafter, the processing procedure will be described mainly with respect to the differences with FIGS. 14 and 15.

Figure 20:
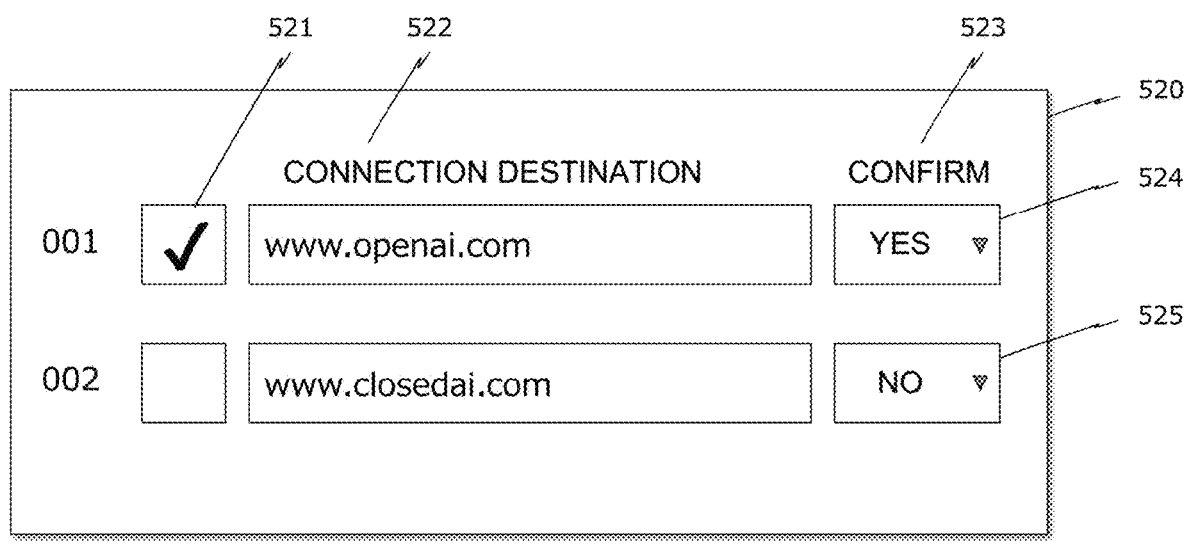
FIG. 20 is an explanatory diagram showing an example of a connection destination setting screen that, in the flowchart of FIG. 18, accepts settings for the natural language processing services and whether or not to request confirmation of providing extracted information.

In the flowchart shown in FIG. 18, when the [Natural language processing service] icon is touched in the same manner as in FIG. 14 (Yes in step S111), the controller 210 serving as the natural language processing usage permission setter 216N performs the following processing. That is, the controller 210 refers to the settings of the natural language processing services to be used and a setting of whether or not to request the user to confirm if the extracted information is to be provided to each of the natural language processing services (step S125). These settings are, for example, set in advance by an administrator of the image processing device 200, and it is assumed that the settings are stored in the data storage 230. FIG. 20 is an explanatory diagram showing an example of a connection destination setting screen 520 that accepts settings by the administrator mentioned above via the operation unit 240.

In the example shown in FIG. 20, a connection destination setting check box 521, a connection destination setting field 522, and an extracted information providing confirmation setting field 523 are disposed in the connection destination setting screen 520 for each connection destination. The connection destination number 001 is in a state where the connection destination setting check box 521 is checked. This indicates a state where it has been selected as a natural language processing service that is used when the [Natural language processing service] icon is touched. In contrast, the connection destination number 002 is in a state where the connection destination setting check box 521 is not checked. This indicates a state where it has not been selected as a natural language processing service that is used when the [Natural language processing service] icon is touched. The URLs used to access the natural language processing services number 001 and 002 are input to the connection destination setting fields 522.

Furthermore, the confirmation setting drop box 524 for number 001 is set to "Yes" for confirmation. When this setting is set (Yes in step S127), the controller 210 serving as the natural language processing usage permission setter 216N displays the extracted information providing confirmation screen shown in FIG. 17 on the operation unit 240 (step S129), and only provides the extracted information and uses the natural language processing service when the permission of the user is obtained. On the other hand, the confirmation setting drop box 525 for number 002 is set to "No" for confirmation. When the natural language processing service number 002 is set to be used, the controller 210 serving as the natural language processing usage permission setter 216N assumes that providing the extracted information is permitted. Then, the extracted information is provided to the natural language processing service number 0002 without displaying the extracted information providing confirmation screen shown in FIG. 17 on the operation unit 240, and the natural language processing service is used. Such a mode corresponds to the processing flow that proceeds to step S141 shown in FIG. 19 via No in step S127 in FIG. 18.

Although the connection destination setting screen 520 in FIG. 20 only shows two natural language processing services, this is merely an example. The settings for a larger number of natural language processing services may be accepted. As can be understood from the fact that the natural language processing services to be used are set by check boxes, the number of natural language processing services that are used is not limited to one. A plurality of natural language processing services can be used at the same time by placing a check in a plurality of check boxes. The foregoing is the second mode of performing natural language processing using extracted information.

Figure 21:
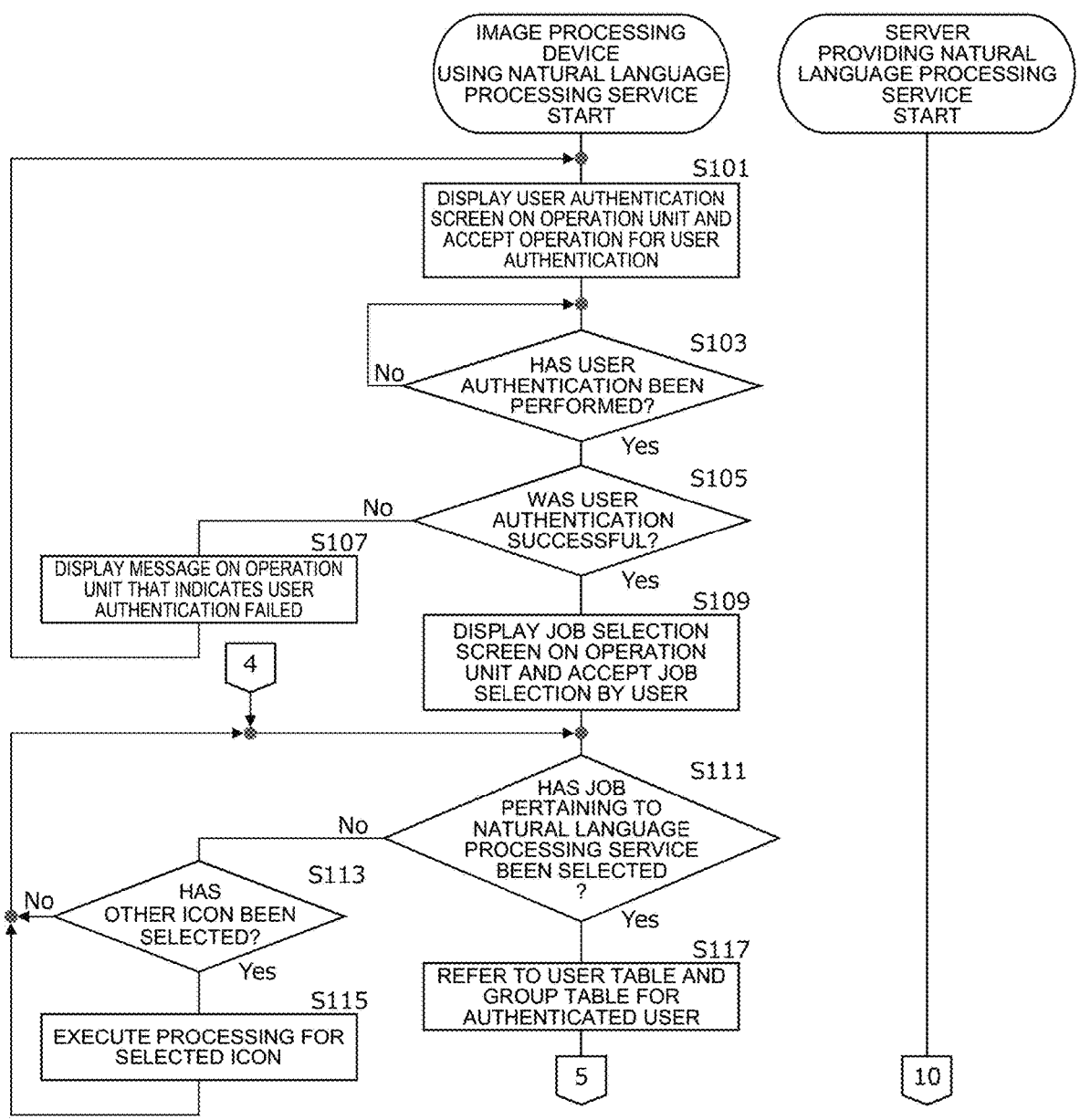
FIG. 21 is a first flowchart showing an example of processing different to that of FIGS. 18 and 19.
Figure 22:
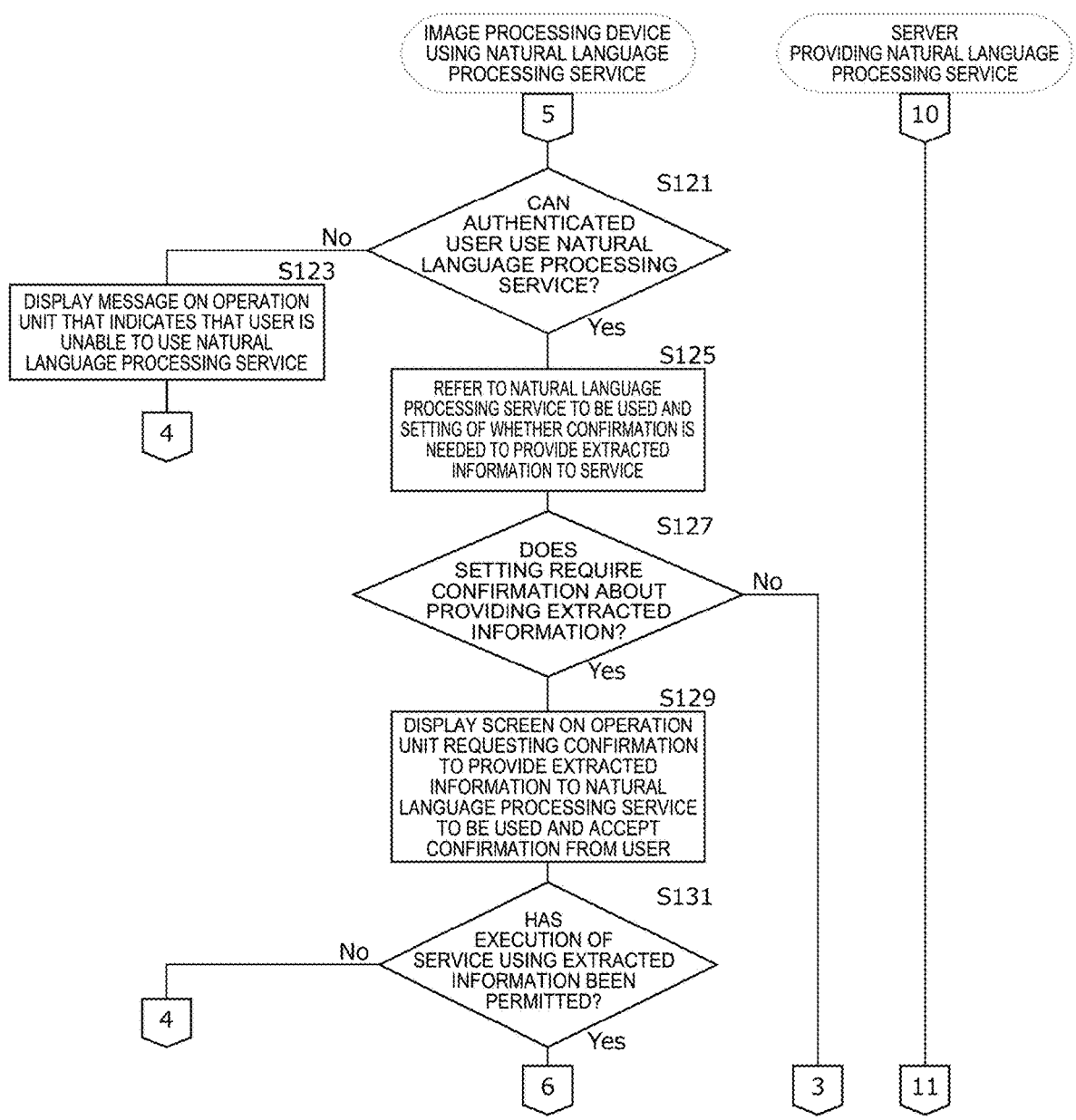
FIG. 22 is a second flowchart showing an example of processing different to that of FIGS. 18 and 19.
Figure 23:
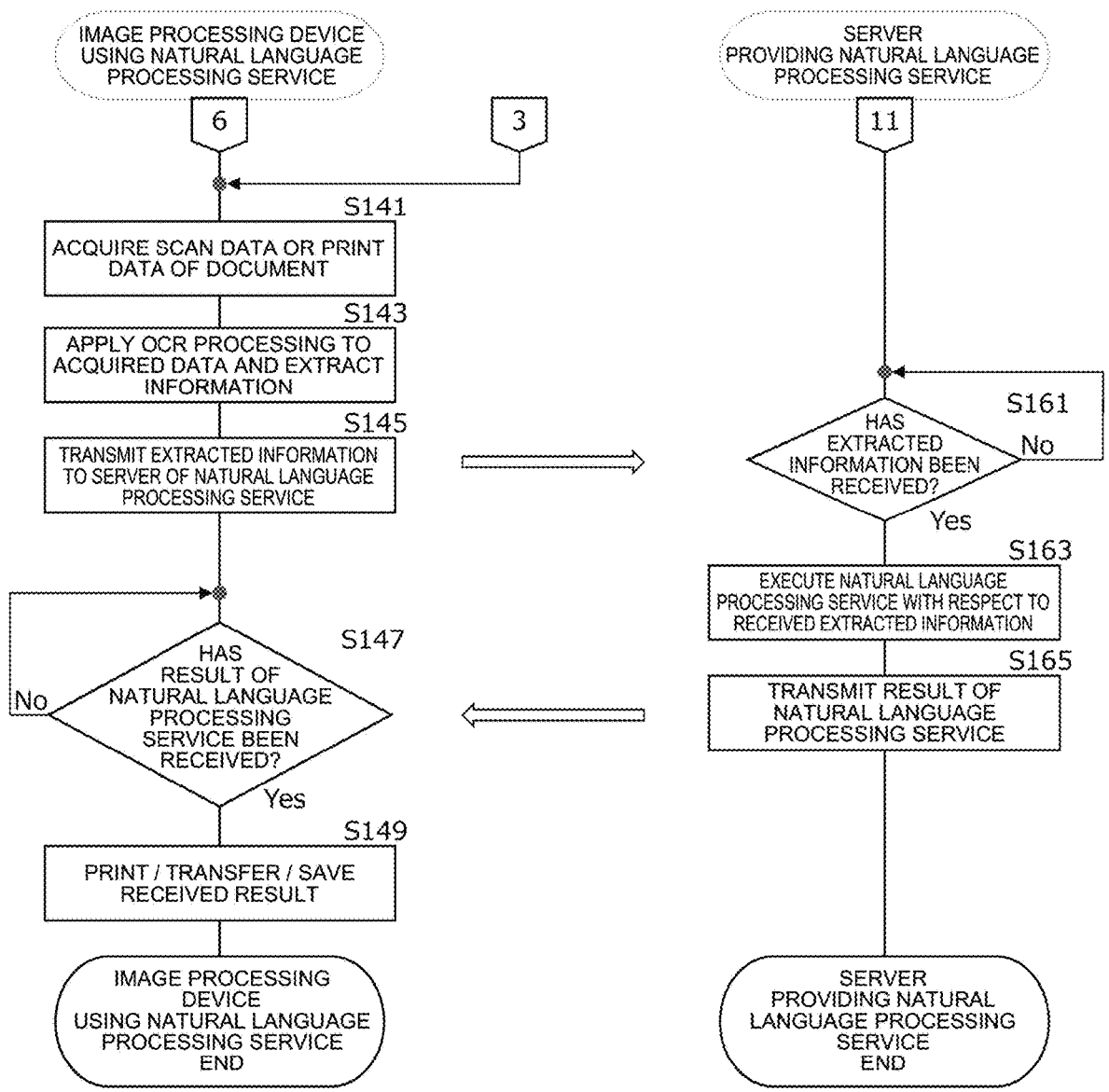
FIG. 23 is a third flowchart showing an example of processing different to that of FIGS. 18 and 19.

Third Mode of Performing Natural Language Processing Using Extracted Information Next, another different example of the processing procedure of a job pertaining to natural language processing will be described. In the third mode, a setting is made for the use of a natural language processing service for each user, and the setting is stored in advance in a data table. An example is shown in the user table 530 in FIG. 24 and the group table 540 in FIG. 25. Furthermore, to enable the user referring to the settings to be specified, in the third mode it is assumed that the image processing device 200 is provided with a user authentication processor 280. FIGS. 21 to 23 are flowcharts showing an example of processing different to that of FIGS. 18 and 19. In FIGS. 21 to 23, the left side represents the processing of the controller 210 of the image processing device 200, and the right side represents the processing of the server controller 310 of the server 300. The same processing as FIGS. 18 and 19 is denoted by the same reference numerals. Hereinafter, the processing procedure will be described mainly with respect to the differences with FIGS. 18 and 19.

As shown in FIG. 21, the controller 210 serving as the user authentication processor 280 firstly displays to the user attempting to use the image processing device 200 a user authentication screen (not shown) on the operation unit 240, and accepts an operation for user authentication (step S101). Although the user authentication can be performed by any method, for example, the input of a user name and password set for each user may be accepted on a user authentication screen. When an input for user authentication is accepted (Yes in step S103), the controller 210 serving as the user authentication processor 280 determines whether or not the inputs match those that have been registered in advance for the user (step S105). When the input does not match those that have been registered in advance for the user (No in step S105), the controller 210 serving as the user authentication processor 280 displays a message on the operation unit 240 indicating that user authentication failed (step S107). Then, the processing returns to step S101 described above, and a user authentication input is accepted again.

When the input matches those that have been registered in advance for the user (Yes in step S105), the controller 210 serving as the user authentication processor 280 performs the following processing in the same manner as FIG. 18. That is, the job selection screen 160 shown in FIG. 16 is displayed on the operation unit 240, and a selection made by the user of the job to be executed by the image processing device 200 is accepted (step S109). When the [Natural language processing service] icon 162 is touched in the same manner as in FIG. 14 (Yes in step S111), the controller 210 serving as the natural language processing usage permission setter 216N performs the following processing. That is, the user table pertaining to the user (authenticated user) that has been successfully authenticated in step S105 and the group table to which the authenticated user belongs are referred to (step S117).

FIG. 24 is an explanatory diagram showing an example of the user table 530 that is referred to by the controller 210 in step S117 described above. FIG. 25 is an explanatory diagram showing an example of the group table 540 that is similarly referred to by the controller 210. In the third mode, authenticated users belong to one of the groups, and settings that are shared by a group are stored in the group table 540. On the other hand, settings unique to a user are stored in the user table 530. These settings are, for example, set in advance by an administrator of the image processing device 200, and are assumed to be stored in the data storage 230 as the user table 530 and the group table 540. In the user table in FIG. 24, the items shown with a "-" indicate the corresponding settings are to be applied by referring to the group table 540 of the group to which each user belongs.

For example, referring to the user table 530 in FIG. 23 for the user with user ID 001, the user belongs to a group with group ID 001. Furthermore, the settings indicating whether or not each type of job, namely scan jobs, copy jobs, print jobs, and natural language processing services, can be executed by the user are all set to "-". That is, the settings conform to the settings of the group with group ID 001 to which the user belongs. Referring to the group table in FIG. 24, the group with group ID 001 has "Yes", that is, a setting that enables execution, for each of monochrome and color for scan jobs, copy jobs, and print jobs. Therefore, the user is capable of executing any of these jobs. Further, the AI service is set to 001. Therefore, the user is capable of using the natural language processing service corresponding to 001 on the connection destination setting screen 520 in FIG. 20.

Moreover, for example, referring to the user table 530 in FIG. 23 for a user with user ID 005, the user belongs to a group with group ID 002. However, the settings indicating whether or not each type of job, namely scan jobs, copy jobs, print jobs, and natural language processing services, can be executed are set in the user table 530. Therefore, whether or not the user is permitted to execute each type of job is determined without referring to the group table 540. That is, because monochrome is set to "Yes" and color is set to "No" for each of scan jobs, copy jobs, and print jobs, only monochrome jobs are set to be executable. The execution of color jobs is not permitted. Because AI services is set to "No", natural language processing services cannot be used.

In this way, the settings of authenticated users is acquired by referring to the user table 530 and the group table 540 for the authenticated users. When an authenticated user has a setting that does not permit the use of the natural language processing service (No in step S121 shown in FIG. 22), the controller 210 serving as the natural language processing usage permission setter 216N performs the following processing. That is, a message indicating that the authenticated user cannot use the natural language processing service is displayed on the operation unit 240 (step S123). Then, the processing returns to step S111 shown in FIG. 21, and selection of a job is accepted on the job selection screen 160. On the other hand, when an authenticated user has a setting permits the use of the natural language processing service (Yes in step S121 shown in FIG. 22), the controller 210 performs the following processing. That is, like the second mode shown in FIG. 18, the controller 210 refers to the settings of the natural language processing services to be used and a setting of whether or not to request the user to confirm if the extracted information is to be provided to each of the natural language processing services (step S125). Depending on the referenced settings, a confirmation is requested if necessary, and the natural language processing service is used to obtain a result. The processing relating to the use of the natural language processing service after step S125 is the same as in FIGS. 18 and 19. The foregoing is the third mode of performing natural language processing using extracted information.

It should be understood that the present disclosure includes combinations of any of the modes described above. In addition to the embodiments described above, various modifications may be made to the present disclosure. Such modifications should not be construed as falling outside the scope of the present disclosure. The present disclosure is embodied by the claims and their equivalents, and should embrace all modifications that fall within the scope of the present disclosure.

What is claimed is:

1. A related information providing method for providing related information pertaining to a job that has been executed, the method comprising, as steps performed by at least one processor that individually or collectively controls an image processing device and a data storage device:
   controlling the image processing device, and executing a job pertaining to image processing that performs at least one of processing that reads a document and outputs or stores image data of the document, or processing that loads print data and prints or stores image data of the print data;
   selecting, by a user, whether or not performing a search, using extracted information, is permitted, the extracted information being obtained by extracting information about at least one of a character or an image from the image data of the document or the print data;
   extracting the extracted information from the image data when the search using the extracted information is permitted;
   searching a database stored in the data storage device for related information that relates to the extracted information;
   providing the user with the related information obtained by the search; and
   registering the extracted information and extraction source image data from which the extracted information was extracted in the database, wherein
   in a case that (i) a selection that permits the usage of the extracted information has been made and (ii) the extracted information includes specific information that has been registered in advance, a second selection that permits the usage of the extracted information is requested.

2. The related information providing method according to claim 1, further comprising:
   authenticating the user; and
   providing user identification information related to the authentication of the user to the data storage device, wherein
   the registering of the extracted information uses the extracted information to determine a search tag pertaining to the extraction source image data, adds the search tag to the extraction source image data, and registers the extraction source image data to which the search tag has been added to the database in association with the user identification information, and
   the searching of the database is processing that uses the search tag determined from the extraction source image data of the job and finds, from within data that has been registered in the database, data in which a related tag has been added as the related information.

3. The related information providing method according to claim 2, wherein
   the search tag is information representing an attribute pertaining to a predetermined item when information about at least one of a character or an image included in the extracted information includes the attribute.

4. The related information providing method according to claim 1, wherein
   the searching for the related information searches external data in addition to searching the database.

5. The related information providing method according to claim 1, wherein
   the providing of the related information to the user causes the user to select one of processing that transmits the related information to the image processing device and causes an operation unit provided in the image processing device to display or print the related information, or processing that transmits the related information to an information processing device registered in advance to the user such that the related information is displayed or stored as data, and also saves a selection made by the user as a history of the user.

6. The related information providing method according to claim 1, wherein
   the selecting of whether or not the usage of the extracted information is permitted accepts a permission selection for each type of the job.

7. The related information providing method according to claim 1, wherein
   the selecting of whether or not the usage of the extracted information is permitted accepts a permission selection that specifies the job or a page.

8. The related information providing method according to claim 1, wherein
   the selecting of whether or not the usage of the extracted information is permitted accepts a permission selection for the information about the character or the information about the image.

9. The related information providing method according to claim 1, wherein
   a location of the data storage device is outside the image processing device, and
   the method further comprises:
   transmitting the extracted information and the extraction source image data to the data storage device.

10. The related information providing method according to claim 1, wherein
   a location of the data storage device is inside the image processing device, and the method further comprises:
outputting the extracted information and the extraction source image data to the data storage device.

11. An image processing system comprising an image processing device and a data storage device that stores a database, wherein
the image processing device comprises;
a job executor that executes a job pertaining to image processing that performs at least one of processing that reads a document and outputs or stores image data of the document, or processing that receives and loads print data and prints or stores image data of the print data,
a search usage permission selector that causes a user to select whether or not a search, using extracted information, is permitted, the extracted information being obtained by extracting information about at least one of a character or an image from the image data of the document or the print data, and
a related information provider that, when the search, using the extracted information, is permitted, provides related information obtained by a search of the database, to the user,
the data storage device comprises:
a related information searcher that, when the search using the extracted information is permitted, searches for the related information that is related to the extracted information from within the database, and provides a search result to the image processing device, and
an extracted information registerer that registers the extracted information and extraction source image data from which the extracted information was extracted in the database, and
the search usage permission selector, in a case that (i) a selection that permits the usage of the extracted information has been made and (ii) the extracted information includes specific information that has been registered in advance, a second selection that permits the usage of the extracted information is requested.

12. An image processing device comprising:
a job executor that executes a job pertaining to image processing that performs at least one of processing that reads a document and outputs or stores image data of the document, or processing that receives and loads print data and prints or stores image data of the print data;
a search usage permission selector that causes a user to select whether or not a search, is using extracted information, is permitted, the extracted information being obtained by extracting information about at least one of a character or an image from the image data of the document or the print data;
a data storage that stores a database;
a related information searcher that, when the search using the extracted information is permitted, searches the data storage for related information that is related to the extracted information from within the database;
a related information provider that provides the related information obtained from the search to the user; and
an extracted information registerer that, when the search, using the extracted information, is permitted, registers the extracted information and extraction source image data from which the extracted information was extracted in the database, wherein
the search usage permission selector, in a case that (i) a selection that permits the usage of the extracted information has been made and (ii) the extracted information includes specific information that has been registered in advance, a second selection that permits the usage of the extracted information is requested.

13. An image processing device comprising:
a job executor that executes a job pertaining to image processing that performs at least one of processing that reads a document and outputs or stores image data of the document, or processing that receives and loads print data and prints or stores image data of the print data;
a natural language processing usage permission setter that accepts a setting of whether or not performing natural language processing, using extracted information that is obtained by extracting information about a character from the image data of the document or the print data, is permitted; and
a processing result acquirer that accesses an external natural language processing service and causes the natural language processing to be performed using the extracted information, and acquires a result from the external natural language processing service, wherein
the natural language processing usage permission setter, in a case that (i) a selection that permits the usage of the extracted information has been made and (ii) the extracted information includes specific information that has been registered in advance, a second selection that permits the usage of the extracted information is requested.

14. The image processing device according to claim 13, wherein
the natural language processing usage permission setter individually accepts a usage permission setting from a user for a plurality of natural language processing services.

15. The image processing device according to claim 13, further comprising:
a user authentication processor that performs authentication of a user from which an instruction is accepted, wherein
the natural language processing usage permission setter accepts a usage permission setting for the natural language processing service for each authenticated user.

16. A method for performing natural language processing using extracted information pertaining to a job, the method comprising, as steps executed by at least one processor that controls an image processing device:
executing a job pertaining to image processing that performs at least one of processing that reads a document and outputs or stores image data of the document, or processing that loads print data and prints or stores image data of the print data;
setting by a user whether or not performing natural language processing, using extracted information that is obtained by extracting information about a character from the image data of the document or the print data, is permitted;
accessing an external natural language processing service and performing the natural language processing using the extracted information when the natural language processing using the extracted information is permitted; and
acquiring a result from the external natural language processing service, wherein
in a case that (i) a selection that permits the usage of the extracted information has been made and (ii) the extracted information includes specific information that has been registered in advance, a second selection that permits the usage of the extracted information is requested.

\* \* \* \* \*